United States Patent
Matsuda et al.

(10) Patent No.: US 8,147,330 B2
(45) Date of Patent: Apr. 3, 2012

(54) GAME APPARATUS AND STORAGE MEDIUM HAVING GAME PROGRAM STORED THEREON

(75) Inventors: Hirokazu Matsuda, Kyoto (JP);
Masafumi Kawamura, Kyoto (JP);
Yoshiaki Koizumi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 770 days.

(21) Appl. No.: 11/546,405

(22) Filed: Oct. 12, 2006

(65) Prior Publication Data
US 2007/0265072 A1  Nov. 15, 2007

(30) Foreign Application Priority Data
May 9, 2006 (JP) ................................ 2006-130720

(51) Int. Cl.
*A63F 13/00* (2006.01)
(52) U.S. Cl. ............... 463/35; 463/34; 463/42; 345/161
(58) Field of Classification Search .................... 463/30, 463/35, 36, 39, 40–43
See application file for complete search history.

(56) References Cited

U.S. PATENT DOCUMENTS

| | | | | |
|---|---|---|---|---|
| 5,795,224 A * | 8/1998 | Yoshida | ............................... | 463/2 |
| 6,331,146 B1 * | 12/2001 | Miyamoto et al. | ............... | 463/32 |
| 6,634,948 B1 * | 10/2003 | Hayashi et al. | .................. | 463/42 |
| 6,821,206 B1 * | 11/2004 | Ishida et al. | ..................... | 463/43 |
| 6,881,147 B2 * | 4/2005 | Naghi et al. | ..................... | 463/35 |
| 7,184,021 B2 * | 2/2007 | Ouchi | ............................ | 345/161 |
| 2003/0216179 A1 * | 11/2003 | Suzuki et al. | ................... | 463/35 |
| 2004/0040434 A1 | 3/2004 | Kondo | | |
| 2004/0219981 A1 * | 11/2004 | Bando | .............................. | 463/35 |
| 2004/0254017 A1 * | 12/2004 | Cheng et al. | ..................... | 463/35 |
| 2005/0282631 A1 * | 12/2005 | Bonney et al. | .................. | 463/35 |
| 2005/0288099 A1 * | 12/2005 | Shimizu et al. | ................. | 463/37 |
| 2006/0017726 A1 * | 1/2006 | Saikawa et al. | ............... | 345/419 |

FOREIGN PATENT DOCUMENTS

| | | |
|---|---|---|
| JP | 5-341786 | 12/1993 |
| JP | 6-208374 | 7/1994 |
| JP | 10-214155 | 8/1998 |
| JP | 10-244073 | 9/1998 |
| JP | 2000-317134 | 11/2000 |
| JP | 2002-023743 | 1/2002 |
| JP | 2004-252149 | 9/2004 |

OTHER PUBLICATIONS

U.S. Appl. No. 11/542,237 which is under an Office Action (Apr. 1, 2010) that rejects the claims based on Kondo (US 2004/0040434).

* cited by examiner

*Primary Examiner* — Paul A D'Agostino
*Assistant Examiner* — Ankit Doshi
(74) *Attorney, Agent, or Firm* — Nixon & Vanderhye P.C.

(57) ABSTRACT

A game apparatus determines whether or not a predetermined first condition is fulfilled. When the first condition is fulfilled, the game apparatus causes the second speaker to generate a sound and moves an object in a virtual game space. When a predetermined second condition regarding a position of the object is fulfilled as a result of the object being moved by the moving control means, the game apparatus causes the first speaker to generate a sound. The game apparatus causes a display device to display the game space.

14 Claims, 16 Drawing Sheets

GAME APPARATUS AND STORAGE MEDIUM HAVING GAME PROGRAM STORED THEREON

CROSS REFERENCE TO RELATED APPLICATION

The disclosure of Japanese Patent Application No. 2006-130720 filed on May 9, 2006 is incorporated herein by reference.

BACKGROUND OF THE INVENTION

1. Field of the Invention

The present invention relates to a game apparatus and a game program, and more specifically to a game apparatus and a game program for allowing a player to perform a game operation using an input device including a speaker.

2. Description of the Background Art

A shooting video game apparatus described in patent document 1 (Japanese Laid-Open Patent Publication No. 10-244073) includes a main game machine including a monitor and a speaker, and a pseudo-gun having a built-in speaker. With this shooting video game apparatus, when the pseudo-gun is triggered during a game, a pseudo-shooting sound is output from the speaker built in the pseudo-gun. In accordance with the result of the determination on each shot, a sound of the bullet hitting an intended object or a sound of the bullet missing the intended object (for example, a bullet hitting sound) is output from the speaker of the main game machine. In this manner, the speaker close to the player outputs a shooting sound while the speaker far from the player outputs a bullet hitting sound.

With the above-described shooting video game apparatus, a shooting sound is generated when the pseudo-gun is triggered, and then a bullet hitting sound is generated when predetermined processing, such as hitting determination processing, is executed. The bullet hitting sound is generated when the predetermined processing is executed after the shooting sound is generated. Therefore, the bullet hitting sound is generated immediately after, but substantially a constant time duration after, the shooting sound is generated. The shooting video game apparatus is provided for a game played using the pseudo-gun, so that a sound is generated from an appropriate location; i.e., a shooting sound is generated from the pseudo-gun and a bullet hitting sound is generated from the main game machine. For this reason, the time duration, from the time when the shooting sound is generated until the time when the bullet hitting sound is generated, is not considered as a control target. Therefore, such a time duration is generally constant as described above. The processing executed by the shooting video game apparatus has a drawback of not being applicable to various sound effects used in games other than the shooting video game using the pseudo-gun. For example, the processing is not applicable to a game in which a sound effect is generated along the movement of an object and thus the sound is not generated at a constant interval.

SUMMARY OF THE INVENTION

A game apparatus and a game program are disclosed for making various sound effects generated when an object moves in a game space more realistic.

The reference numerals, additional descriptions and the like in parentheses in this section of the specification indicate the correspondence with the embodiments described later for easier understanding of the present invention, and do not limit the present invention in any way.

A first aspect of the disclosed game apparatus and game program is directed to a storage medium having stored thereon a game program (61) executable by a computer (CPU 10) of a game apparatus (3) for causing a first speaker (49) provided in an input device (controller 7) and a second speaker (22) provided outside the input device to generate a sound. The game program causes the computer to execute a determination step (step S12), a first sound control step (S14), a moving control step (S21), a second sound control step (S23), and a display control step (S8). In the determination step, the computer determines whether or not a predetermined first condition is fulfilled. In the first sound control step, the computer causes the second speaker to generate a sound (sound effect for the game) when the first condition is fulfilled. In the moving control step, the computer moves an object (second object 52) in a virtual game space when the first condition is fulfilled. In the second sound control step, the computer causes the first speaker to generate a sound (sound effect for the game) when a predetermined second condition regarding a position of the object is fulfilled as a result of the object being moved in the moving control step. In the display control step, the computer causes a display device to display the game space.

In a second aspect, the game program may cause the computer to further execute an indicated position calculation step (S11) of calculating an indicated position on a screen of the display device based on an operation input to the input device. In this case, in the determination step, the computer uses, as the first condition, that the object is designated by the operation input to the input device, and determines whether or not the first condition is fulfilled by comparing the indicated position and the position of the object on the screen.

In a third aspect, the input device may include imaging means (imaging information calculation section 35). In this case, in the indicated position calculation step, the computer calculates the indicated position based on a position of a predetermined imaging target (markers 8a and 8b) in an image taken by the imaging means.

In a fourth aspect, in the moving control step, when the first condition is fulfilled, the computer may cause an object which has been at a pause or moving in accordance with a predetermined first rule to start moving in accordance with a second rule, which is different from the first rule.

In a fifth aspect, at least a moving object movable in the moving control step (second object 52) and a player object operable by a player (first object 51) may appear in the game space. In this case, in the second sound control step, the computer uses, as the second condition, that the moving object approaches the player object to be within a predetermined distance from the player object.

A sixth aspect is directed to a computer-readable storage medium having stored thereon a game program executable by a computer (CPU 10) of a game apparatus (3) for causing a first speaker (49) provided in an input device (controller 7) and a second speaker (22) provided outside the input device to generate a sound. The game program causes the computer to execute a determination step, a first sound control step, a moving control step, a second sound control step, and a display control step. In the determination step, the computer determines whether or not a predetermined first condition is fulfilled. In the first sound control step, the computer causes one of the first speaker and the second speaker to generate a sound when the first condition is fulfilled. In the moving control step, the computer moves an object in a virtual game space when the first condition is fulfilled. In the second sound control step, the computer causes the other of the first speaker and the second speaker to generate a sound when a predetermined second condition regarding a position of the object is fulfilled as a result of the object being moved in the moving control step. In the display control step, the computer causes a display device to display the game space.

A seventh aspect is directed to a computer-readable storage medium having stored thereon a game program executable by a computer (CPU 10) of a game apparatus (3) for causing a first speaker provided in a first input device (first controller) and a second speaker provided in a second input device (second controller) to generate a sound. The game program causes the computer to execute a determination step, a first sound control step, a moving control step, a second sound control step, and a display control step. In the determination step, the computer determines whether or not a predetermined first condition is fulfilled. In the first sound control step, the computer causes the second speaker to generate a sound when the first condition is fulfilled. In the moving control step, the computer moves an object in a virtual game space when the first condition is fulfilled. In the second sound control step, the computer causes the first speaker to generate a sound when a predetermined second condition regarding a position of the object is fulfilled as a result of the object being moved in the moving control step. In the display control step, the computer causes a display device to display the game space.

The present invention may be provided in the form of a game apparatus for executing processing equivalent to the processing executed by the above-described game program.

According to the first, sixth and seventh aspects, when the object starts moving in the game space, a sound is generated from the second speaker. By contrast, when a predetermined condition is fulfilled as a result of the object being moved, a sound is generated from the first speaker. In this manner, a sound is generated from a different speaker depending on whether the movement is started or the predetermined condition is fulfilled. Owing to this, the player can recognize that the object is moving by the display on the screen and also by the sound effects. According to the first, sixth and seventh aspects, various sound effects generated when the object moves in the game space can be made realistic.

According to the second aspect, the object to be moved is designated using the indicated position which is calculated based on an operation input to the input device. Namely, the player can designate the object to be moved using the input device.

According to the third aspect, the indicated position is calculated using an image taken by the imaging means. Therefore, the position on the screen pointed to by the input device can be calculated as the indicated position. This allows the player to designate an object by an operation of pointing to a desired position on the screen. Therefore, according to the third aspect, the player can designate an object easily and in a novel operation, which is different from pressing buttons.

According to the fifth aspect, when the moving object which has been moved toward the player object approaches to be within a predetermined distance from the player object, a sound is generated from the first speaker provided in the input device. Namely, when the moving object approaches the player object, a sound is generated from the input device held by the player's hand. This makes the player feel as if the moving object was approaching the player himself/herself. The player feels as if he/she was the player object, which makes the game more realistic.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
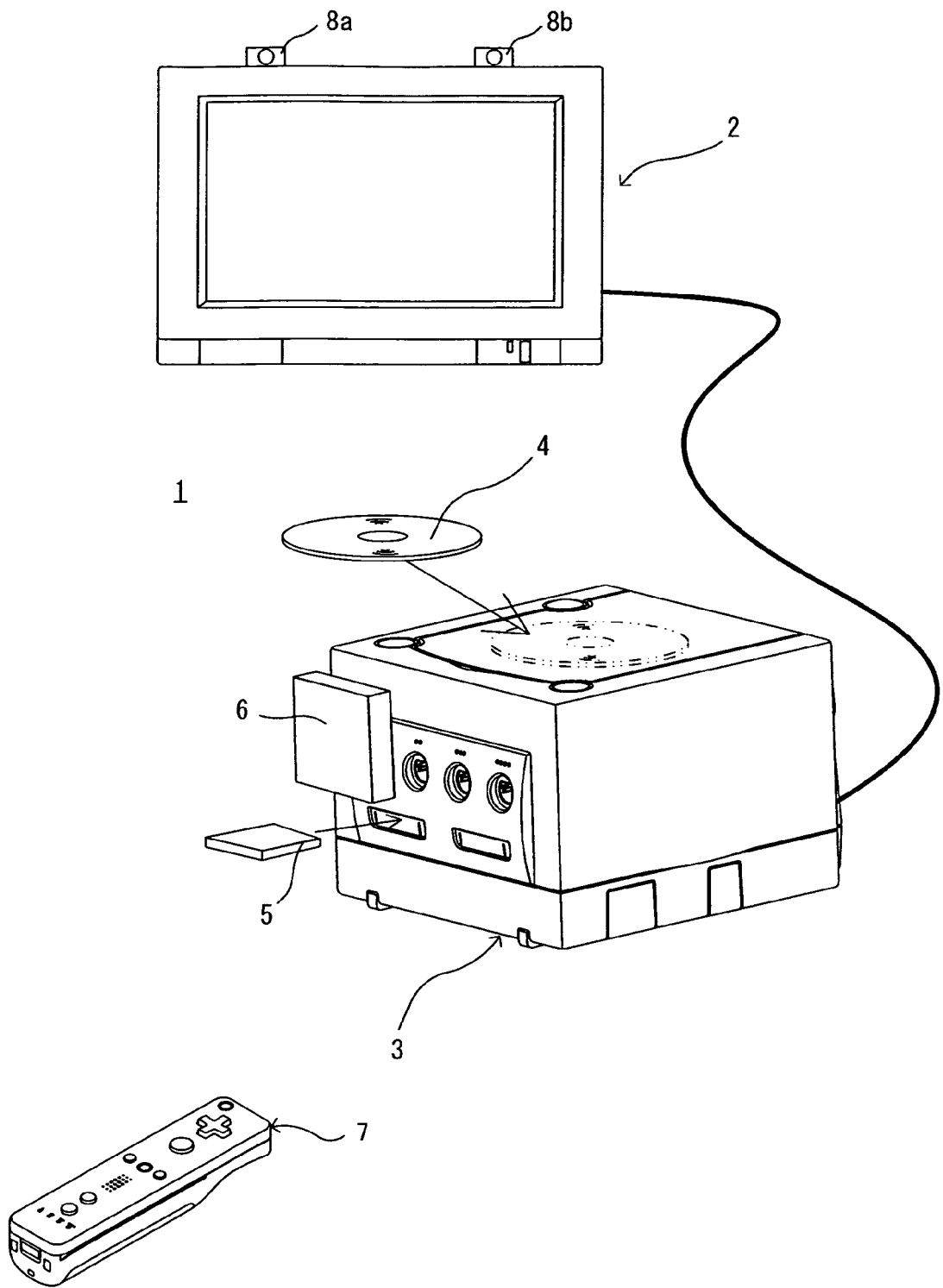
FIG. 1 is an external view of a game system including a game apparatus 3 according to an embodiment of the present invention.

With reference to FIG. 1, a game system 1 including a game apparatus 3 according to an embodiment of the present invention will be used. FIG. 1 is an external view of the game system 1. In the following description, the game apparatus 3 is of an installation type.

As shown in FIG. 1, the game system 1 includes the game apparatus 3 and a controller 7. The controller 7 is an input device for providing the game apparatus 3 with operation data representing operation particulars made on the controller 7. The game apparatus 3 executes game processing described later in accordance with the operation data. In this embodiment, the game apparatus 3 is of an installation type. In another embodiment, the game apparatus may be of a mobile type or an arcade game apparatus. The game apparatus 3 is connected to a display device (hereinafter, referred to as a "monitor") 2 such as a home-use TV receiver including a speaker 22 (FIG. 2) via a connection cord. The monitor 2 displays a game image obtained as a result of the game processing. Two markers 8a and 8b are provided in the vicinity of the monitor 2 (above the screen of the monitor 2 in FIG. 1). The markers 8a and 8b are specifically infrared LEDs, and each outputs infrared light forward from the monitor 2.

The game apparatus 3 is connected to a communication unit 6 via a connection terminal. The communication unit 6 receives operation data which is wirelessly transmitted from the controller 7 and also transmits operation data to the controller 7 upon an instruction from the game apparatus 3. In this manner, the controller 7 and the game apparatus 3 are connected to each other by wireless communication. In another embodiment, the controller 7 and the game apparatus 3 may be connected to each other in a wired manner.

On the game apparatus 3, an optical disc 4 as an example of an exchangeable information storage medium is detachably mounted. The game apparatus 3 has, on a top main surface thereof, a power ON/OFF switch, a game processing reset switch, and an OPEN switch for opening a top lid of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. The player playing with the game apparatus 3 can enjoy the game by operating the controller 7 while watching the game image displayed on the display screen of the monitor 2.

The controller 7 wirelessly transmits operation data to the game apparatus 3 connected to the communication unit 6, using the technology of, for example, Bluetooth (registered trademark). The controller 7 includes an operation section having a plurality of operation buttons (operation keys). As described later in detail, the controller 7 also includes an imaging information calculation section 35 for taking an image as seen from the controller 7. The imaging information calculation section 35 takes an image of each of the markers 8a and 8b, as imaging targets, located in the vicinity of the monitor 2. Data on the taken images is transmitted to the game apparatus 3 as a part of the operation data. The game apparatus 3 executes calculation processing based on data regarding the taken images, so as to execute processing in accordance with the position and the posture of the controller 7. The controller 7 also includes an acceleration sensor 37 (described later) for detecting an acceleration in a linear direction. Data representing an acceleration detected by the acceleration sensor 37 is transmitted to the game apparatus 3 as a part of the operation data. The game apparatus 3 can calculate the motion and/or posture of the controller 7 based on the data representing the acceleration and execute processing in accordance with the motion and/or posture of the controller 7 when necessary.

Figure 6:
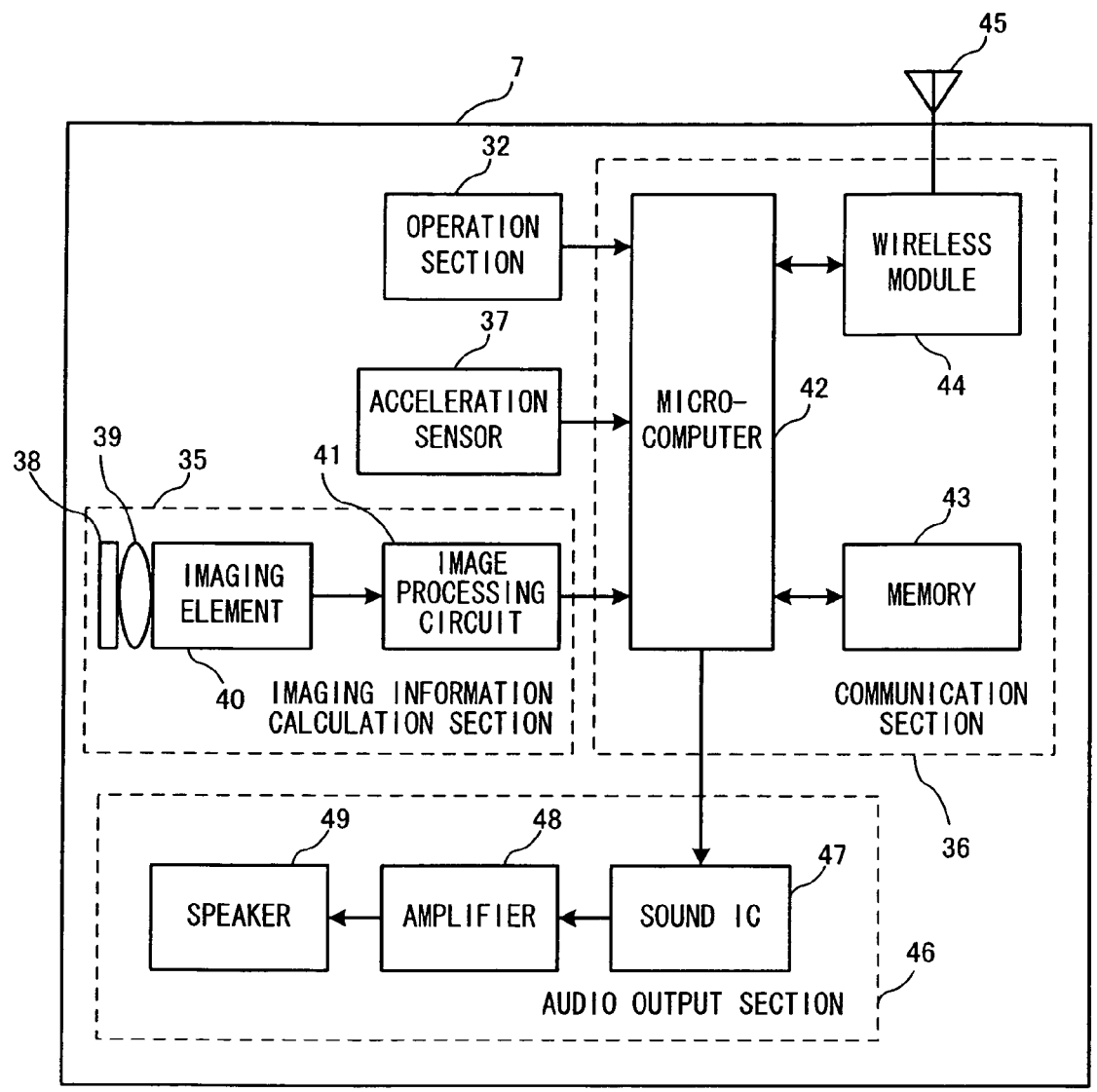
FIG. 6 is a block diagram illustrating a structure of the controller 7.

The controller 7 receives various data from the game apparatus 3 via the communication unit 6, and performs various types of operations in accordance with the received data. For example, when receiving sound data from the game apparatus 3, the controller 7 outputs a sound in accordance with the sound data from a built-in speaker 49 (FIG. 6).

Figure 2:
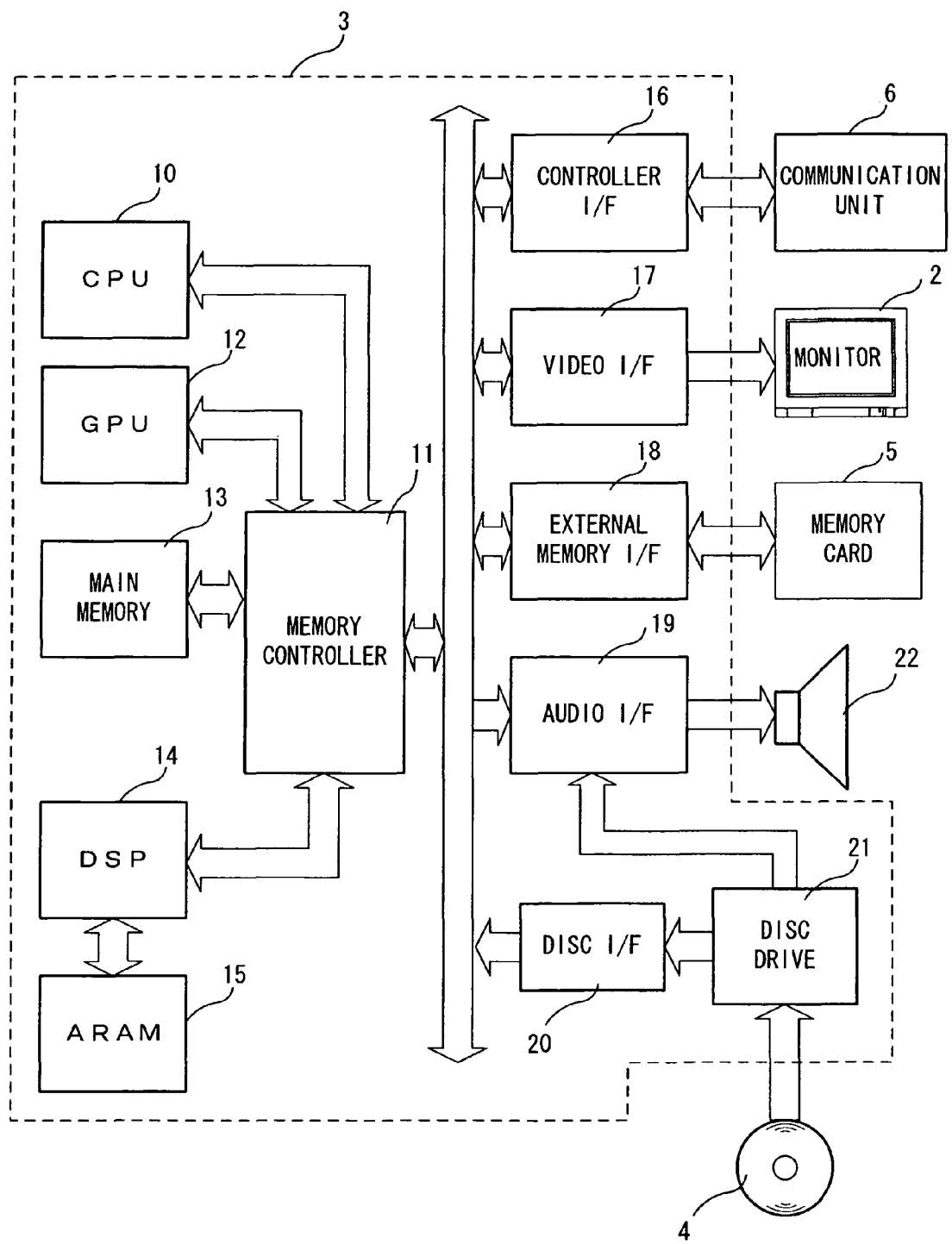
FIG. 2 is a functional block diagram of the game apparatus 3.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 10 for executing various types of programs. The CPU 10 executes a start program stored on a boot ROM (not shown) to, for example, initialize memories including a main memory 13, and then executes a game program stored on the optical disc 4 to perform game processing or the like in accordance with the game program. The CPU 10 is connected to a GPU (Graphics Processing Unit) 12, the main memory 13, a DSP (Digital Signal Processor) 14, and an ARAM (Audio RAM) 15 via a memory controller 11. The memory controller 11 is connected to a controller I/F (interface) 16, a video I/F 17, an external memory I/F 18, an audio I/F 19, and a disc I/F 20 via a predetermined bus. The controller I/F 16, the video I/F 17, the external memory I/F 18, the audio I/F 19 and the disc I/F 20 are respectively connected to the communication unit 6, the monitor 2, the external memory card 5, the speaker 22 and a disc drive 21.

The GPU 12 performs image processing based on an instruction from the CPU 10. The GPU 12 includes, for example, a semiconductor chip for performing calculation processing necessary for displaying 3D graphics. The GPU 12 performs the image processing using a memory dedicated for image processing (not shown) and a part of the storage area of the main memory 13. The GPU 12 generates game image data and a movie to be displayed on the display screen of the monitor 2 using such memories, and outputs the generated data or movie to the monitor 2 via the memory controller 11 and the video I/F 17 as necessary.

The main memory 13 is a storage area used by the CPU 10, and stores a game program or the like necessary for processing performed by the CPU 10 as necessary. For example, the main memory 13 stores a game program read from the optical disc 4 by the CPU 10, various types of data or the like. The game program, the various types of data or the like stored in the main memory 13 are executed by the CPU 10.

The DSP 14 processes sound data or the like generated by the CPU 10 during the execution of the game program. The DSP 14 is connected to the ARAM 15 for storing the sound data or the like. The ARAM 15 is used when the DSP 14 performs predetermined processing (for example, storage of the game program or sound data already read). The DSP 14 reads the sound data stored in the ARAM 15 and outputs the sound data to the speaker 22 via the memory controller 11 and the audio I/F 19.

The memory controller 11 comprehensively controls data transfer, and is connected to the various I/Fs 16 through 20 described above. The controller I/F 16 includes, for example, four controller I/Fs, and communicably connects the game apparatus 3 to an external device which is engageable via connectors of the controller I/Fs. For example, the communication unit 6 is engaged with such a connector and is connected to the game apparatus 3 via the controller I/F 16. As described above, the communication unit 6 receives the operation data from the controller 7 and outputs the operation data to the CPU 10 via the controller I/F 16. When the sound data or other data generated by the CPU 10 is transmitted to the controller 7, such data is output to the communication unit 6 via the controller I/F 16. The communication unit 6 transmits the data, which is input from the controller I/F 16, to the controller 7. In another embodiment, the game apparatus 3 may include a communication module which is communicable with the controller 7, in stead of the communication unit 6. In this case, the operation data received by the communication module is output to the CPU 10 via a predetermined bus, and the data to be transmitted to the controller 7 is transmitted from the communication module to the controller 7 via a predetermined bus. The video I/F 17 is connected to the monitor 2. The external memory I/F 18 is connected to the external memory card 5 and is accessible to a backup memory or the like provided in the external card 5. The audio I/F 19 is connected to the speaker 22 built in the monitor 2, and is connected such that the sound data read by the DSP 14 from the ARAM 15 or sound data directly output from the disc drive 21 is output from the speaker 22. The disc I/F 20 is connected to the disc drive 21. The disc drive 21 reads data stored at a predetermined reading position of the optical disc 4 and outputs the data to a bus of the game apparatus 3 or the audio I/F 19.

Figure 3:
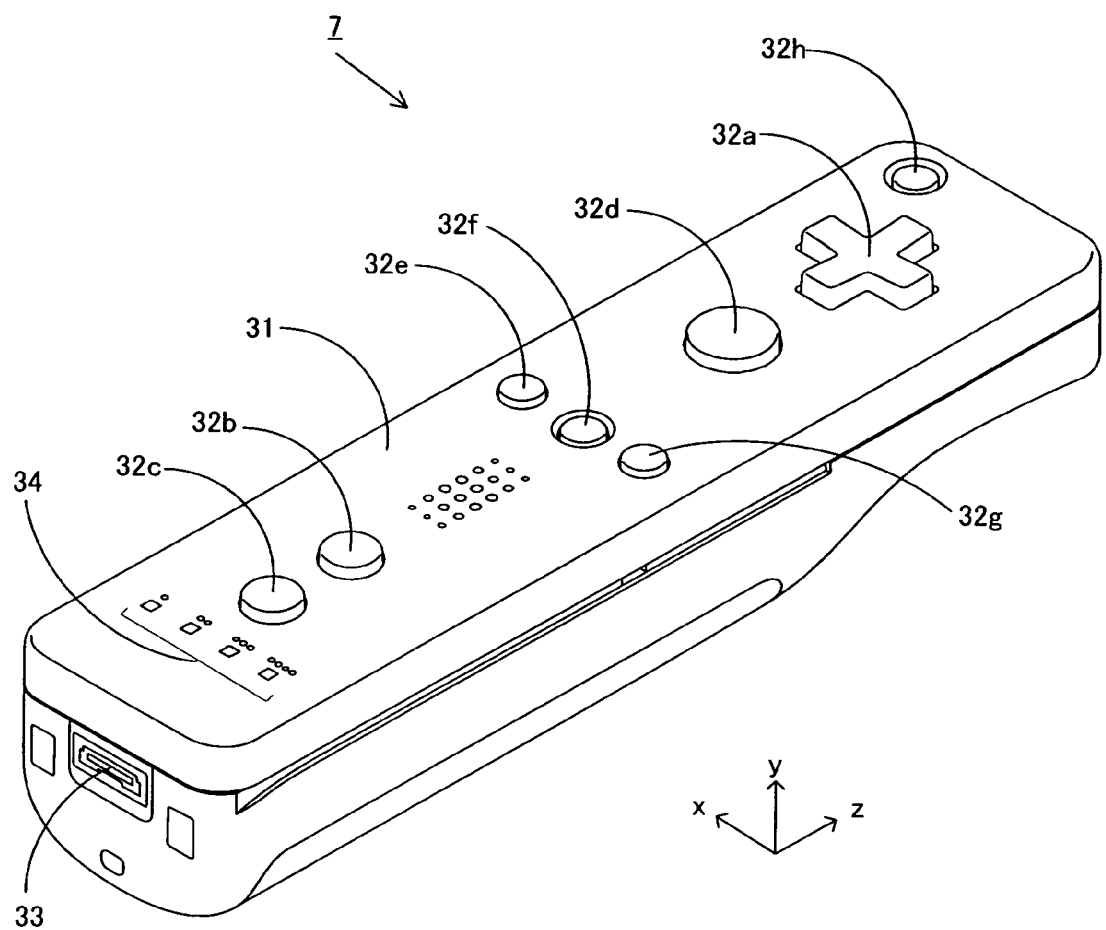
FIG. 3 is an isometric view of a controller 7 shown in FIG. 1 seen from the top rear side thereof.
Figure 4:
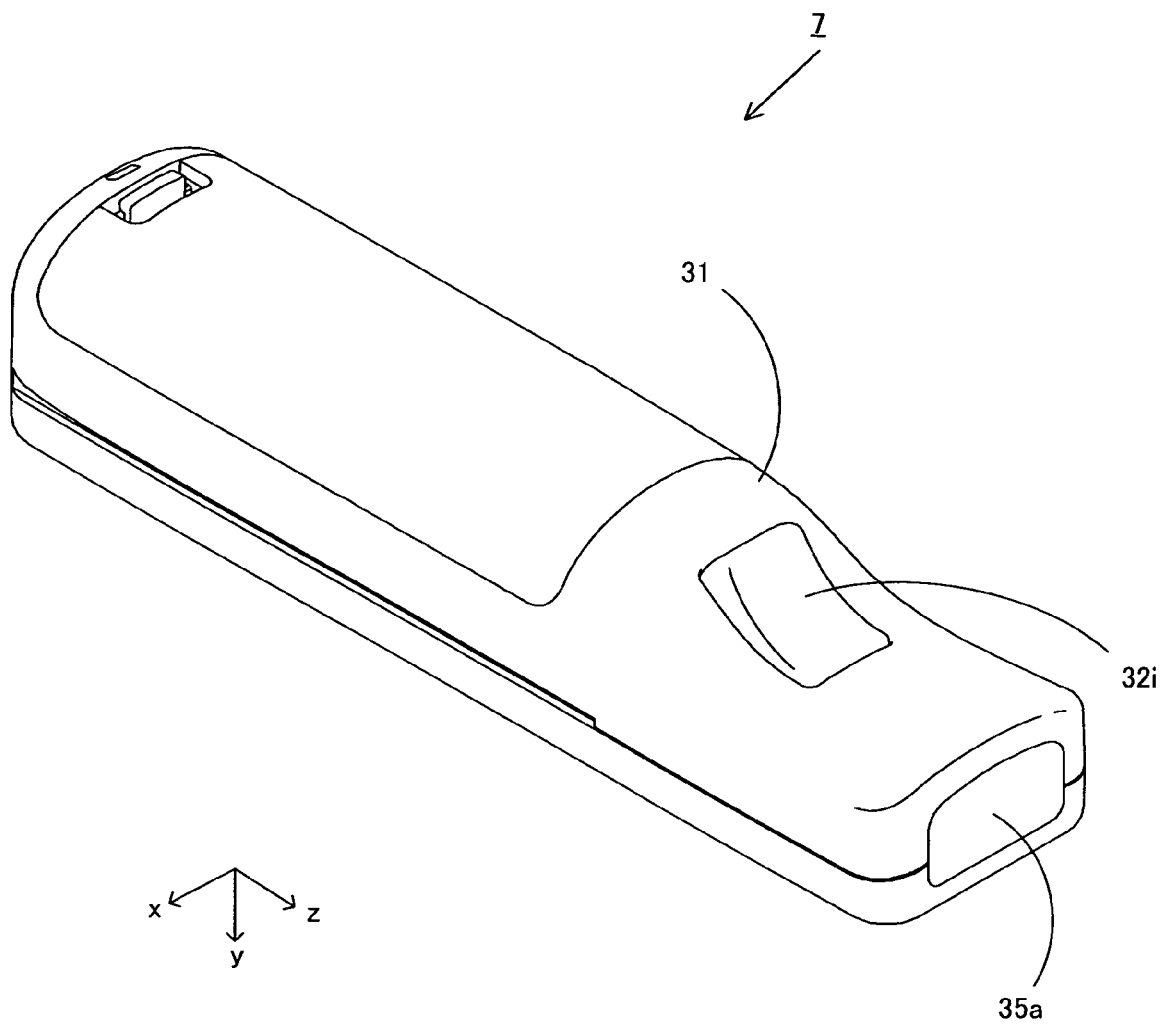
FIG. 4 is an isometric view of the controller 7 shown in FIG. 1 seen from the bottom rear side thereof.

With reference to FIG. 3 through FIG. 6, the controller 7 will be described. FIG. 3 and FIG. 4 are external isometric views of the controller 7. FIG. 3 is an isometric view of the controller 7 seen from the top rear side thereof. FIG. 4 is an isometric view of the controller 7 seen from the bottom rear side thereof.

As shown in FIG. 3 and FIG. 4, the controller 7 includes a housing 31 formed by plastic molding or the like. The housing 31 has a generally parallelepiped shape extending in a longitudinal or front-rear direction (the z-axis direction shown in FIG. 3). The overall size of the housing 31 is small enough to be held by one hand of an adult or even a child. The player can perform a game operation by, for example, pressing buttons provided on the controller 7 or moving the controller 7 itself and thus changing the position or direction thereof. For example, the player can perform an operation on an operation target by rotating the controller 7 around an axis in the longitudinal direction thereof or changing the position indicated by the controller 7 on the display screen. The "position indicated by the controller 7 on the display screen" ideally refers to a position at which a phantom straight line extending from a front end of the controller 7 in the longitudinal direction crosses the display screen of the monitor 2. However, the "position indicated by the controller 7 on the display screen" does not need to be exactly such a position, but may be a position in the vicinity thereof which can be calculated by the game apparatus 3. Hereinafter, such a position will be sometimes referred to as an "indicated position" or an "indicated position by the controller 7". The longitudinal direction of the controller 7 (housing 31) will be sometimes referred to as an "indicated direction".

The housing 31 has a plurality of operation buttons. As shown in FIG. 3, provided on a top surface of the housing 31 are a cross key 32a, a first button 32b, a second button 32c, an A button 32d, a minus button 32e, a home button 32f, and a plus button 32g. As shown in FIG. 4, on a bottom surface of the housing 31, a recessed portion is formed. On a rear slope surface of the recessed portion, a B button 32i is provided. These buttons 32a through 32i are assigned various functions in accordance with the game program executed by the game apparatus 3. On the top surface of the housing 31, a power switch 32h is provided for remotely turning on or off the game apparatus 3. The home button 32f and the power switch 32h have a top surface thereof buried in the top surface of the housing 31, so as not to be inadvertently pressed by the player.

On a rear surface of the housing 31, a connector 33 is provided. The connector 33 is used for connecting the controller 7 to another device. For example, a sub control unit including a stick inclinable at any angle in 360° may be connected to the controller 7 via a cable. In this case, a direction can be input in accordance with the operation on the sub control unit, and also a predetermined position on the display screen (described later) can be indicated by performing an operation on the controller 7. By connecting such a sub control unit to the controller 7 via a cable, a direction is input while moving the controller 7 freely.

In a rear part of the top surface of the housing 31, a plurality of (four in FIG. 3) LEDs 34 are provided. The controller 7 is assigned a controller type (number) so as to be distinguishable from the other controllers 7. The LEDs 34 are used for informing the player of the controller type which is currently set to controller 7 that he/she is using. Specifically, when the controller 7 transmits the operation data to the game apparatus 3, one of the plurality of LEDs 34 corresponding to the controller type is lit up.

Figure 5A:
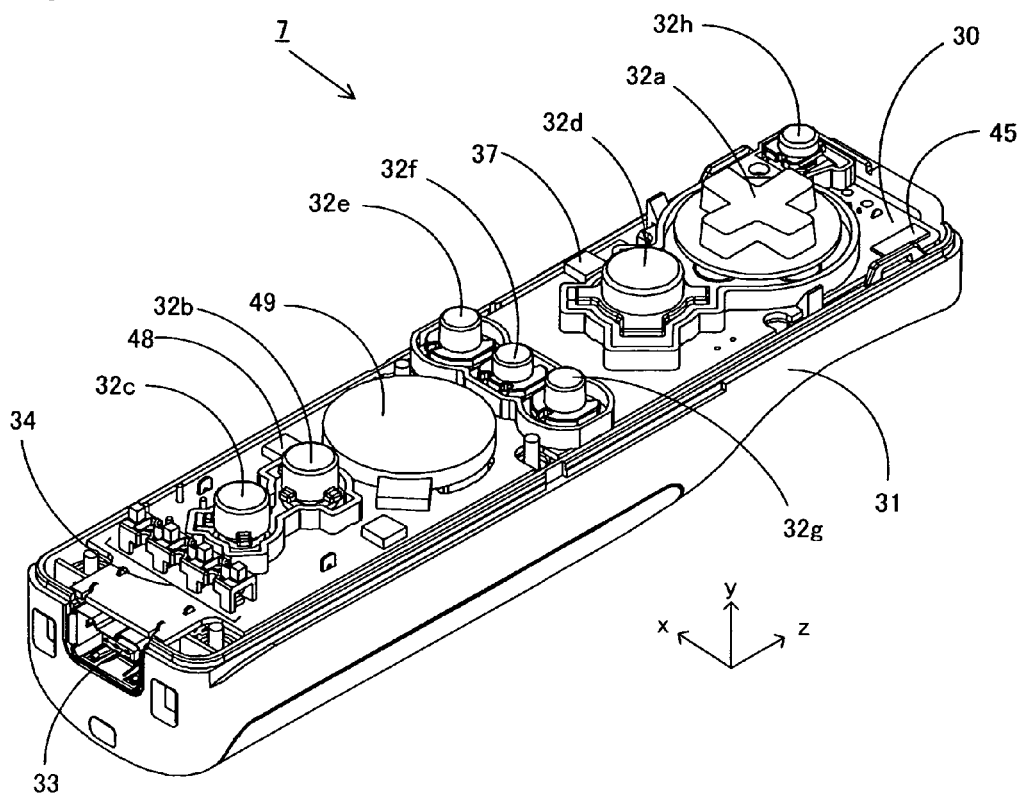
FIG. 5A shows an internal structure of the controller 7.
Figure 5B:
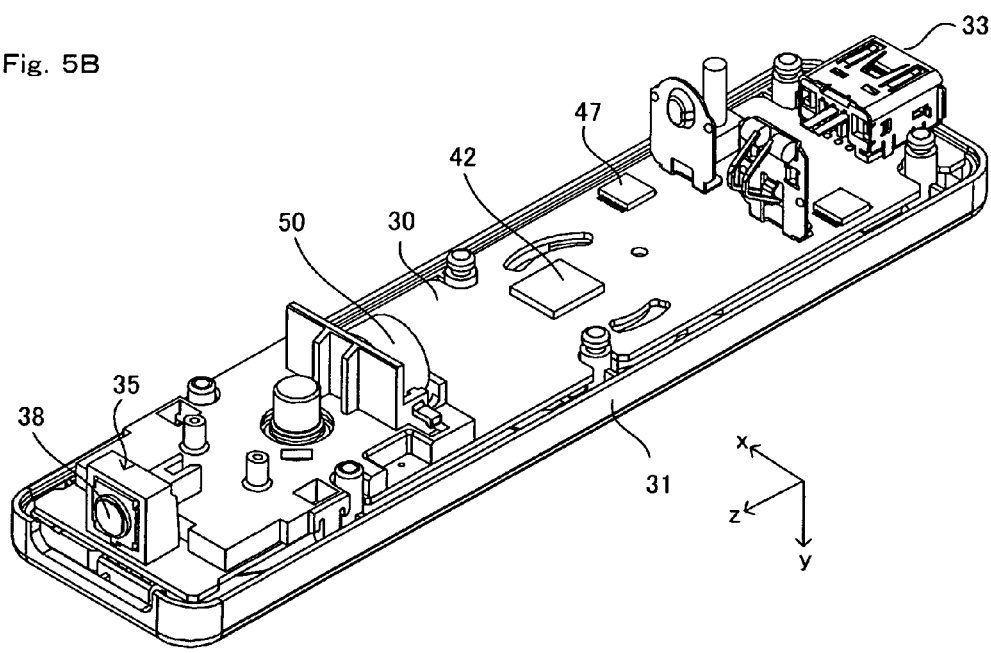
FIG. 5B shows an internal structure of the controller 7.

The controller 7 includes the imaging information calculation section 35 (FIG. 5B). As shown in FIG. 4, a light incident opening 35a of the imaging information calculation section 35 is provided on a front surface of the housing 31. The light incident opening 35a is formed of a material which allows infrared light from the markers 8a and 8b to be at least transmitted therethrough.

On the top surface of the housing 71, sound holes are formed between the first button 32b and the home button 32f for releasing the sound outside from the built-in speaker 49 (FIG. 5A).

With reference to FIG. 5A and FIG. 5B, an internal structure of the controller 7 will be described. FIG. 5A and FIG. 5B illustrate an internal structure of the controller 7. FIG. 5A is an isometric view illustrating a state where an upper casing (a part of the housing 31) of the controller 7 is removed. FIG. 5B is an isometric view illustrating a state where a lower casing (a part of the housing 31) of the controller 7 is removed. FIG. 5B shows a reverse side of a substrate 30 shown in FIG. 5A.

As shown in FIG. 5A, the substrate 30 is fixed inside the housing 31. On a top main surface of the substrate 30, the operation buttons 32a through 32h, the LEDs 34, the acceleration sensor 37, an antenna 45, an amplifier 48, the speaker 49 and the like are provided. These elements are connected to a microcomputer 42 (see FIG. 6) via lines (not shown) formed on the substrate 30 and the like. In this embodiment, the acceleration sensor 37 is located at a position off the center of the controller 7 in the x-axis direction. This makes it easy to calculate the motion of the controller 7 when the controller 7 is rotated around the z-axis. The wireless module 44 and the antenna 45 allow the controller 7 to act as a wireless controller.

As shown in FIG. 5B, at a front edge of a bottom main surface of the substrate 30, the imaging information calculation section 35 is provided. The imaging information calculation section 35 includes an infrared filter 38, a lens 39, an imaging element 40 (for example, a CMOS image sensor or a CCD image sensor) and an image processing circuit 41 located in this order from the front surface of the controller 7. These elements are attached to the bottom main surface of the substrate 30.

On the bottom main surface of the substrate 30, the microcomputer 42, a sound IC, and a vibrator 50 are provided. The sound IC 47 is connected to the microcomputer 42 and the amplifier 48 via lines (not shown) formed on the substrate 30 and the like. The vibrator 50 is, for example, a vibration motor or a solenoid, and is connected to the microcomputer 42 via lines (not shown) formed on the substrate 30 or the like. The controller 7 is vibrated by an actuation of the vibrator 50 upon an instruction from the microcomputer 42, and the vibration is conveyed to the player holding the controller 7. Thus, a so-called vibration-responsive game is realized. In this embodiment, the vibrator 50 is located in a relatively forward position of the housing 31. Since the vibrator 50 is located off the center of the housing 31, the vibration of the vibrator 50 can cause a significant vibration to the entire controller 7. The connector 33 is provided at a rear edge of the bottom main surface of the substrate 30. The controller 7 includes a quartz oscillator for generating a reference clock for the microcomputer 42 and the like in addition to the elements shown in FIG. 5A and FIG. 5B.

The shape of the controller 7, the shape of the buttons, and the number, position or the like of the acceleration sensor and the vibrator shown in FIG. 3 through FIG. 5B are merely exemplary, and may be altered without departing from the scope of the present invention. The position of the imaging information calculation section 35 (the light incident opening 35a of the imaging information calculation section 35) in the controller 7 does not need to be on the front surface of the housing 31, and may be on another surface as long as light can enter from the outside of the housing 31. In this case, the "indicated direction by the controller 7" is the imaging direction of the imaging element 40, specifically, a direction vertical to the light incident opening.

FIG. 6 is a block diagram showing a structure of the controller 7. The controller 7 includes the operation section 32 (operation buttons), the imaging information calculation section 35, the communication section 36, the acceleration sensor 37, and an audio output section 46. In this embodiment, the output from the acceleration sensor 37 is not used for the game processing, and thus the controller 7 does not need to have the acceleration sensor 37.

The operation section 32 corresponds to the operations buttons 32a through 32i described above, and outputs data representing an input state on each of the operations buttons 32a through 32i (whether or not each of the operations buttons 32a through 32i is pressed) to the microcomputer 42 of the communication section 36.

The imaging information calculation section 35 is a system for analyzing image data taken by imaging means and detecting the position of the center of gravity, the size and the like of an area having a high brightness in the image data. The imaging information calculation section 35 has, for example, a maximum sampling period of about 200 frames/sec., and therefore can trace and analyze even a relatively fast motion of the controller 7.

The imaging information calculation section 35 includes the infrared filter 38, the lens 39, the imaging element 40 and the image processing circuit 41. The infrared filter 38 allows only infrared light to pass therethrough, among light incident on the front surface of the controller 7. The lens 39 collects the infrared light which has passed through the infrared filter 38 and outputs the infrared light to the imaging element 40. The imaging element 40 is a solid-state imaging device such as, for example, a CMOS sensor or a CCD sensor. The imaging element 40 takes an image of the infrared light collected by the lens 39, and outputs an image signal. The markers 8a and 8b located in the vicinity of the display screen of the monitor 2 are infrared LEDs for outputting infrared light forward from the monitor 2. The provision of the infrared filter 38 allows the imaging element 40 to receive only the infrared light transmitted through the infrared filter 38 to generate image data. Therefore, the image of each of the markers 8a and 8b can be more accurate. Hereinafter, an image taken by the imaging element 40 will be referred to as a "taken image". The image data generated by the imaging element 40 is processed by the image processing circuit 41. The image processing circuit 41 calculates the positions of the imaging targets (the markers 8a and 8b) in the taken image. Hereinafter, a method for calculating the positions of the imaging targets will be described with reference to FIG. 7.

Figure 7:
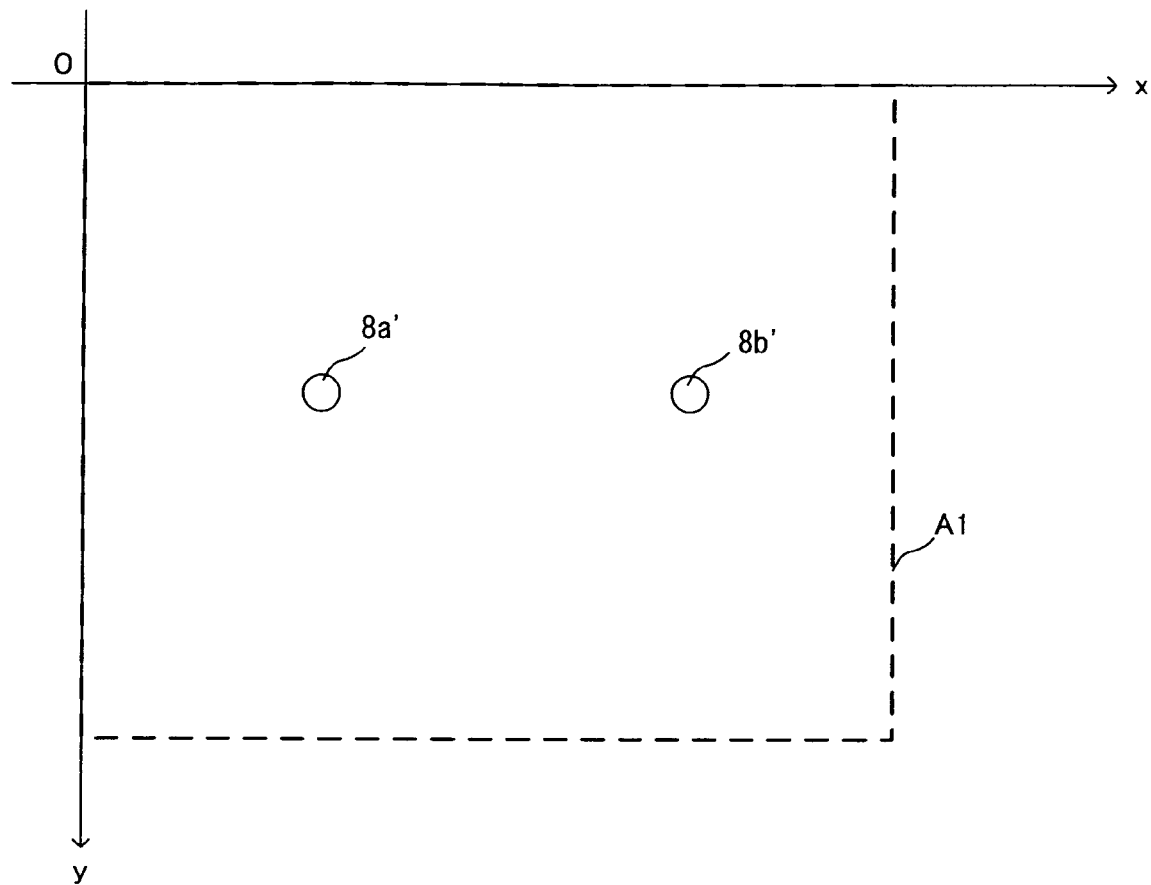
FIG. 7 shows an exemplary taken image including target images.

FIG. 7 shows an example of a taken image. In a taken image A1 shown in FIG. 7, an image 8a' of the marker 8a and an image 8b' of the marker 8b are arranged side by side. When the taken image is input, the image processing circuit 41 calculates a coordinate set representing the position of each of areas in the taken image which match a predetermined condition. Here, the predetermined condition is a condition for specifying an image of an imaging target (target image). A specific predetermined condition is that the area has a brightness of a predetermined value or greater (a high luminance area) and has a size within a predetermined size range. The predetermined condition only needs to be a condition for specifying an imaging target, and in another embodiment, may include a condition regarding the color of the image.

For calculating the position of the target image, the image processing circuit 41 specifies high brightness areas described above, from the areas in the taken image, as candidates for the target image. The reason is that a target image appears as a high brightness area in the image data of the taken image. Next, based on the size of each specified high brightness area, the image processing circuit 41 executes determination processing of determining whether or not each of the high brightness areas is a target image. The taken image may include images other than the target images, i.e., images 8a' and 8b' of the markers 8a and 8b, due to sunlight coming through a window or light of a fluorescent lamp. In this case, the images other than the images 8a' and 8b' of the markers 8a and 8b also appear as high brightness areas. The above-mentioned determination processing is executed in order to distinguish the images 8a' and 8b' as the target images from the other images, so that the target images are accurately specified. Specifically, it is determined whether or not each specified high brightness area has a size with in a predetermined size range. When the high brightness area has a size within the predetermined size range, such an area is determined to represent a target image; whereas when the high brightness area has a size outside the predetermined size range, such an area is determined to represent an image other than a target image.

The image processing circuit 41 calculates the position of a high brightness area which is determined to represent a target image as a result of the determination. Specifically, the image processing circuit 41 calculates the position of the center of gravity of the high brightness area. The position of the center of gravity can be calculated in a scale more detailed than the resolution of the imaging element 40. Here, even when the resolution of a taken image taken by the imaging element 40 is 126×96, the position of the center of gravity is calculated at a scale of 1024×768. The coordinate set of the position of the center of gravity is represented by integers of (0, 0) to (1024, 768). As shown in FIG. 7, positions in the taken image are represented by a coordinate system (X-Y coordinate system), in which the upper left corner of the taken image is the origin, the downward direction from the origin is a positive Y-axis direction, and the rightward direction from the origin is a positive X-axis direction.

As described above, the image processing circuit 41 calculates the coordinate set representing the position of each of areas in the taken image which match the predetermined condition. The image processing circuit 41 outputs the calculated coordinate set to the microcomputer 42 of the communication section 36. Data on the coordinate set is transmitted to the game apparatus 3 as operation data by the microcomputer 42. Hereinafter, such a coordinate set will be referred to as a "marker coordinate set". Since the marker coordinate set varies in accordance with the direction (posture) or position of the controller 7 itself, the game apparatus 3 can calculate the direction or position of the controller 7 using the marker coordinate set.

Returning to FIG. 6, the acceleration sensor 37 detects an acceleration (including acceleration of gravity) of the controller 7. Namely, the acceleration sensor 37 detects a force (including the force of gravity) applied to the controller 7. The acceleration sensor 37 detects a value of the acceleration in a linear direction along a sensing axis among the accelerations acting on a detection section of the acceleration sensor 37. For example, in the case of a multi-axial (including two-axial) acceleration sensor, an acceleration of a component along each axis (linear acceleration) is detected as an acceleration acting on the detection section of the acceleration sensor. For example, a three-axial or two-axial acceleration sensor 37 may be available from Analog Devices, Inc. or STMicroelectroincs N.V.

In this embodiment, the acceleration sensor 37 detects a linear acceleration in each of an up-down direction with respect to the controller 7 (y-axis direction shown in FIG. 3), a left-right direction with respect to the controller 7 (x-axis direction shown in FIG. 3), and a front-rear direction with respect to the controller 7 (z-axis direction shown in FIG. 3). Since the acceleration sensor 37 detects an acceleration in the linear direction along each axis, the output from the acceleration sensor 37 represents a value of the linear acceleration along each of the three axes. Namely, the detected acceleration is represented as a three-dimensional vector in an x-y-z coordinate system which is set with respect to the controller 7. Data representing the acceleration detected by the acceleration sensor 37 (acceleration data) is output to the communication section 36. In this embodiment, the communication section 36 of the controller 7 outputs acceleration data to the game apparatus 3 at a constant interval (for example, every 0.5 ms). The game apparatus 3 can calculate the moving direction or the inclination (posture) of the controller 7 based on the acceleration data. Since the acceleration sensor 37 detects a linear component of acceleration along each of the axes, the game apparatus 3 cannot directly detect the moving direction or the inclination of the controller 7. The moving direction or the inclination of a device mounted on the acceleration sensor 37 is calculated by executing predetermined calculation processing on the acceleration detected for each axis of the acceleration sensor 37.

The communication section 36 includes the microcomputer 42, a memory 43, the wireless module 44 and the antenna 45. The microcomputer 42 controls the wireless module 44 for wirelessly transmitting the data obtained by the microcomputer 42 while using the memory 43 as a storage area during processing.

Data which is output from the operation section 32, the imaging information calculation section 35, and the acceleration sensor 37 to the microcomputer 42 is temporarily stored in the memory 43. The wireless transmission from the communication section 36 to the communication unit 6 is performed at a predetermined time interval. Since game processing is generally performed at a cycle of 1/60 sec. (at a cycle of one frame), the wireless transmission is preferably performed at a cycle of a time period equal to or shorter than 1/60 sec. At the transmission timing to the communication unit 6, the microcomputer 42 outputs the data stored in the memory 43 to the wireless module 44 as operation data. The wireless module 44 uses, for example, the Bluetooth (registered trademark) technology to modulate a carrier wave of a predetermined frequency with the operation data and radiate the resultant very weak electric signal from the antenna 45. Namely, the operation data is modulated into a very weak electric signal by the wireless module 44 and transmitted from the controller 7. The very weak electric signal is received by the communication unit 6 on the side of the game apparatus 3. The received very weak electric signal is demodulated or decoded, so that the game apparatus 3 can obtain the operation data. The CPU 10 of the game apparatus 3 executes the game processing based on the obtained operation data and the game program.

The game apparatus 3 transmits sound data to the controller 7 at an appropriate timing in accordance with the situation in the game. The sound data transmitted from the game apparatus 3 is received by the antenna 45. The microcomputer 42 obtains the sound data received by the antenna 45 via the wireless module 44. The microcomputer 42 also outputs the obtained sound data to the audio output section 46.

The audio output section 46 includes the sound IC 47, the amplifier 48, and the speaker 49. When the sound data is input from the microcomputer 42, the sound IC 47 executes predetermined processing on the sound data and outputs an audio signal to the speaker 49 via the amplifier 48. In this way, the game apparatus 3 can output an audio signal such as a sound effect for the game from the speaker 49 of the controller 7.

By using the controller 7, the player can perform a game operation of changing the posture of the controller 7, moving the position of the controller 7 or rotating the controller 7, in addition to a conventional general operation of pressing the operation buttons.

Figure 8:
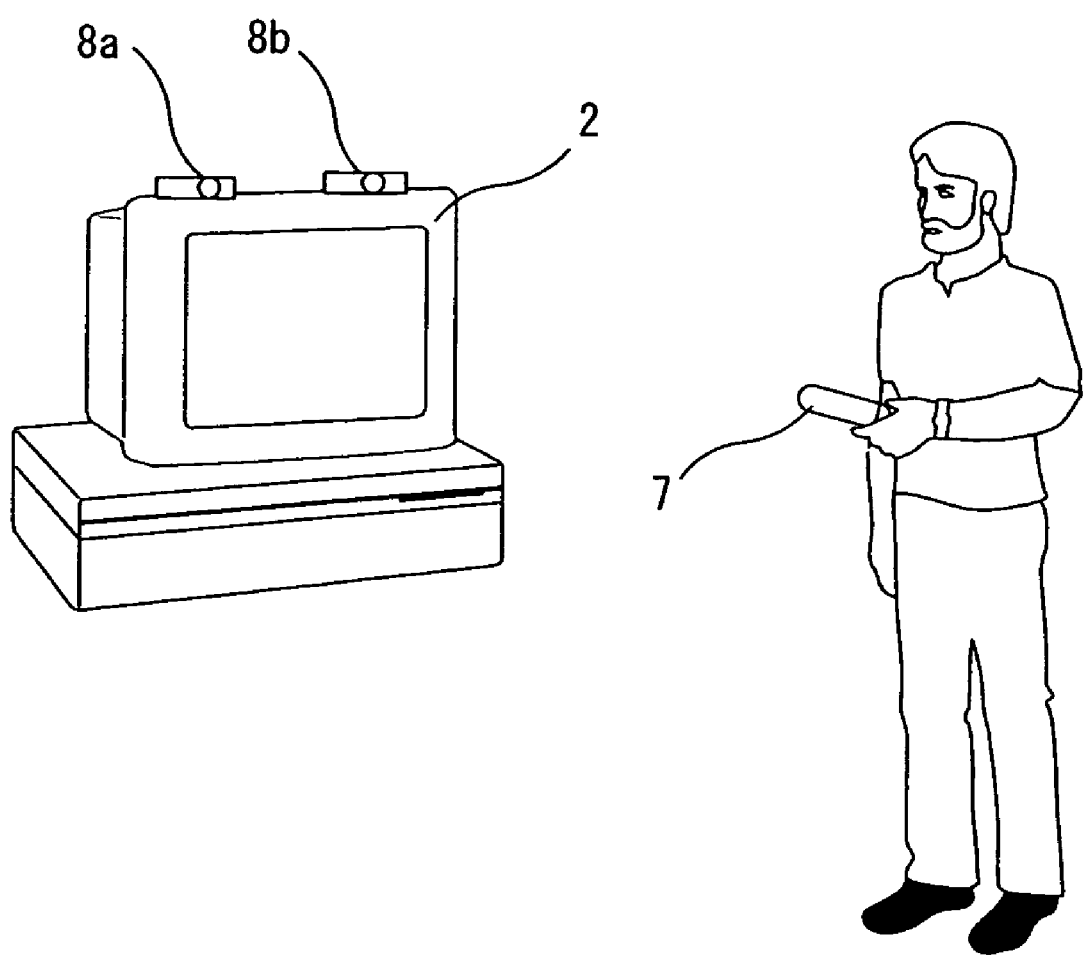
FIG. 8 shows how the controller 7 is used to perform a game operation.

FIG. 8 shows how the controller 7 is used to perform a game operation. As shown in FIG. 8, when playing the game using the controller 7 with the game system 1, the player holds the controller 7 with one hand. In this embodiment, the player designates any position on the display screen of the monitor 2 (designates a desired position on the display screen as the indicated position by the controller 7).

Hereinafter, specific examples of the game playable using the above-described game system 1 will be described. In such a game, both the speaker 49 built in the controller 7 (hereinafter, referred to as a "first speaker") and the speaker 22 built in the monitor 2 (hereinafter, referred to as a "second speaker") are used in order to generate a sound effect for the game. Specifically, a sound effect is selectively output from one of the speakers in accordance with the position or the positional relationship of an object appearing in the game. The game apparatus 3 selectively uses the two speakers, i.e., the first speaker 49 held by the player's hand and the second speaker 22 far from the player to generate a sound effect, so that the player can recognize the movement of the object in the game space owing to the sound effect. In the following, generation of a sound effect during a game will be described in detail. During the game, a sound other than sound effects, for example, background music, may be generated from the speaker 22 or 49. Hereinafter, with reference to FIG. 9 through FIG. 12, an overview of the game will be described.

Figure 9:
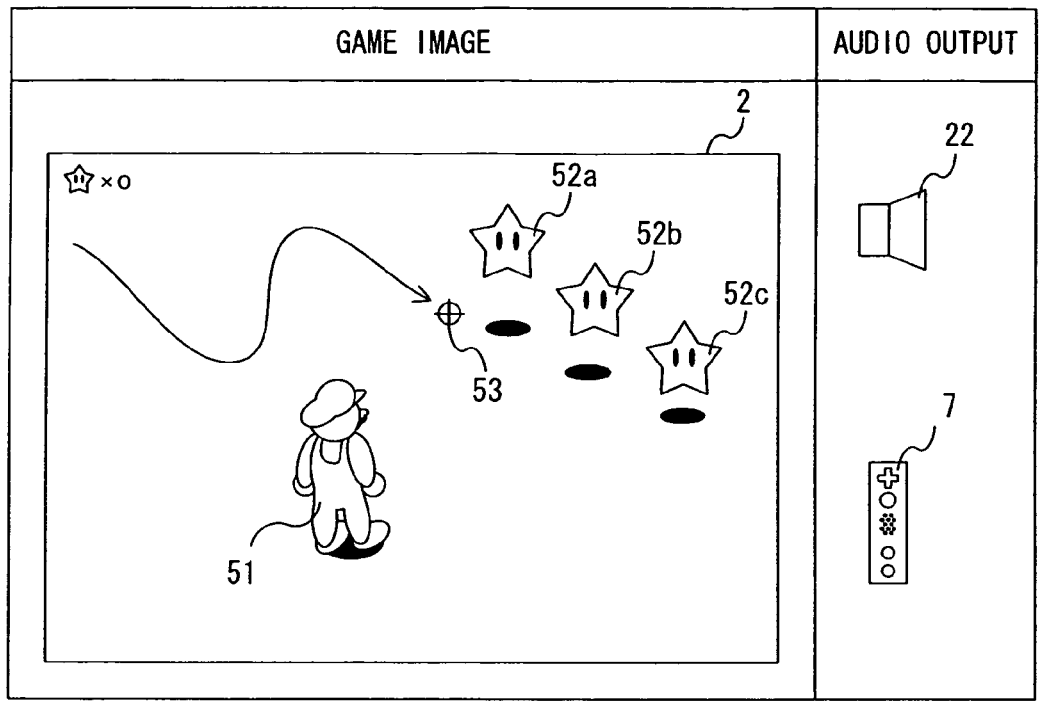
FIG. 9 shows an exemplary game image displayed on a monitor 2 in this embodiment and a state of audio output corresponding to the game image.

FIG. 9 through FIG. 12 each show a game image displayed on the monitor 2 in this embodiment and a state of audio output corresponding to the respective game image. As shown in FIG. 9, the screen of the monitor 2 displays a game space in which a first object 51 and second objects 52 are located. The first object 51 is a player object operated by the player. The first object 51 moves, for example, in accordance with an operation input to the cross key 32 on the controller 7. In another embodiment, a sub control unit including a stick may be connected to the connector 33 of the controller 7 as described above, so that the first object 51 moves in accordance with an operation input to the stick. The second objects 52 are each an item object representing an item appearing in the game. In FIG. 9 through FIG. 12, three second objects 52a through 52c are displayed. The screen of the monitor 2 also displays a cursor 53. The cursor 53 is displayed at the position on the screen indicated by the controller 7, i.e., at the indicated position described above. The player can move the cursor 53 by moving the controller 7 itself (see the arrow in FIG. 9). With this game, the player operates the first object 51 and the cursor 53 in order to achieve the aim of causing the first object 51 to acquire a second object 52. The numeral displayed at the top left corner of the screen represents the number of items (second objects 52) acquired by the first object 51.

Figure 10:
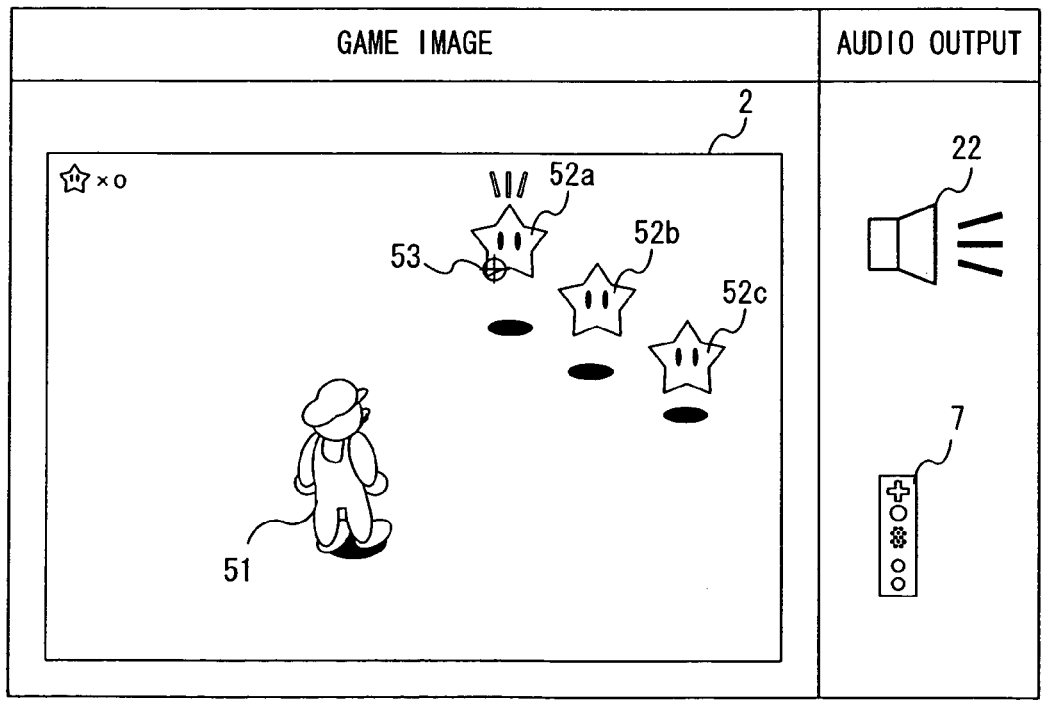
FIG. 10 shows another exemplary game image displayed on the monitor 2 in this embodiment and a state of audio output corresponding to the game image.
Figure 11:
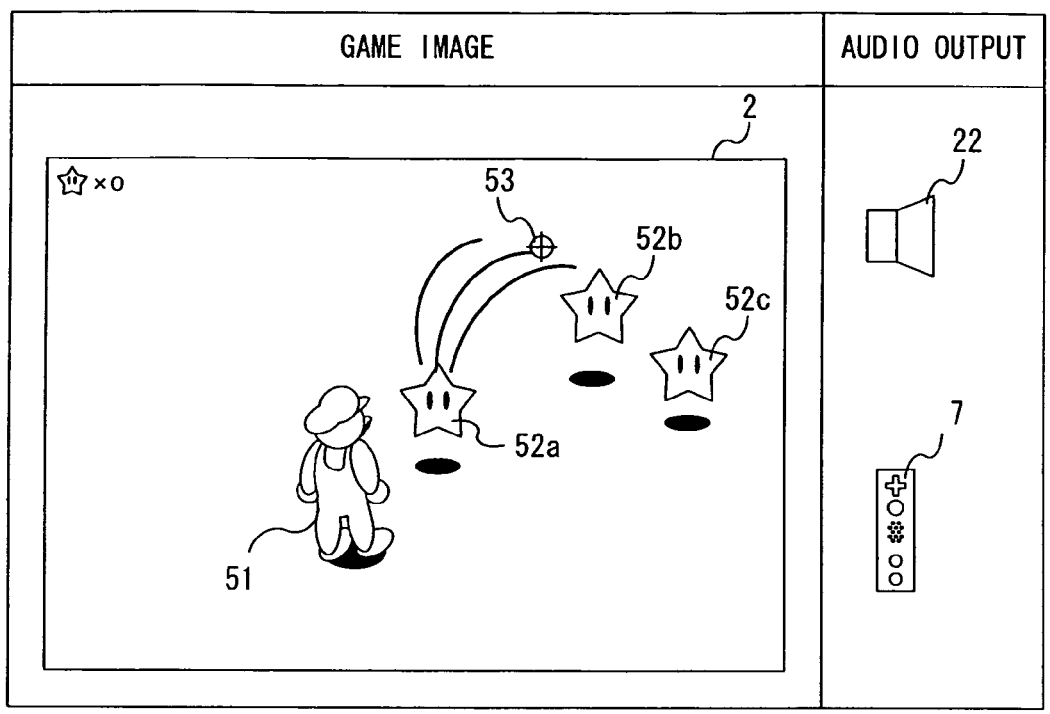
FIG. 11 shows still another exemplary game image displayed on the monitor 2 in this embodiment and a state of audio output corresponding to the game image.

In the game, the player uses the controller 7 to operate the first object 51 and the cursor 53 (FIG. 9). At the point shown in FIG. 9, no sound effect is generated. The player operates the controller 7 so as to designate a second object 52 by the cursor 53, i.e., so as to cause the cursor 53 to overlap one of the second objects 52a through 52c. When the cursor 53 overlaps one of the second objects 52a through 52c, a sound effect is generated from the second speaker 22 (FIG. 10). The game image shown in FIG. 10 is provided when the cursor 53 designates the second object 52a. The second object 52a designated by the cursor 53 starts moving toward the first object 51 (FIG. 11). Owing to the sound effect from the second speaker 22, the player can recognize that the second object 52a is designated by the cursor 53, i.e., that the second object 52a started moving.

Figure 12:
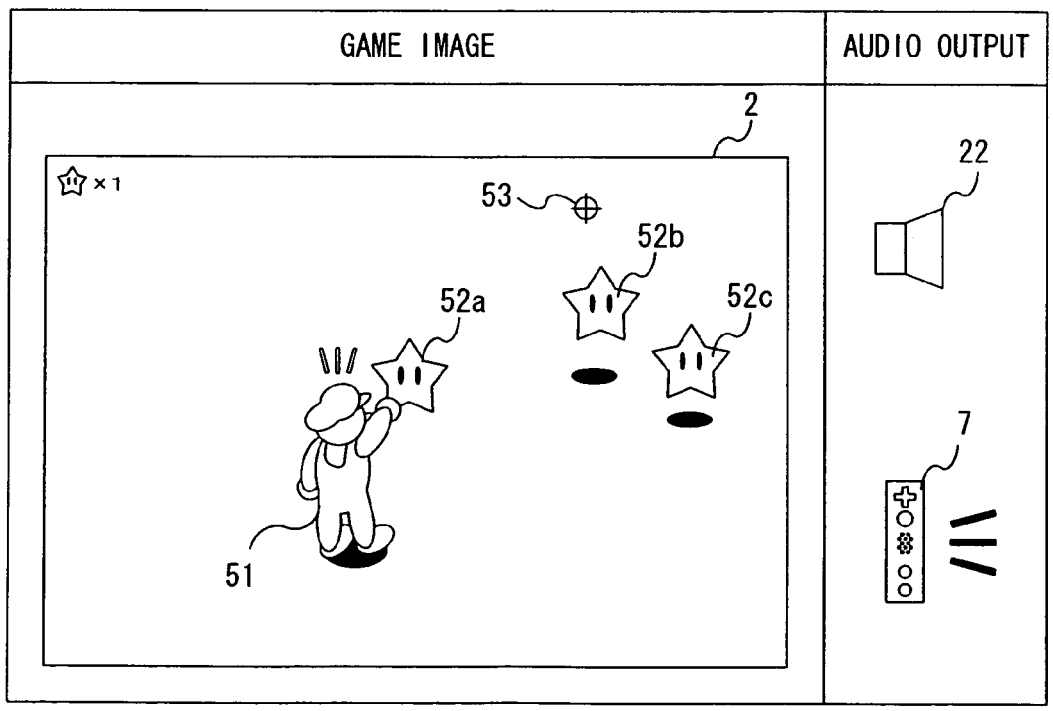
FIG. 12 shows still another exemplary game image displayed on the monitor 2 in this embodiment and a state of audio output corresponding to the game image.

When the first object 51 and the second object 52a have contacted each other as a result of the second object 52a having started moving, the game apparatus 3 determines that the first object 51 acquired the second object 52a. Then, a sound effect is generated from the first speaker 49 of the controller 7 (FIG. 12). Owing to the sound effect from the first speaker 49, the player can recognize that the first object 51 acquired the second object 52a.

As described above, in this embodiment, when the second object 52 starts moving, a sound effect is generated from the second speaker 22 of the monitor 2 far from the player. When the second object 52 reaches the position of the first object 51, a sound effect is generated from the first speaker 49 of the controller 7 held by the player's hand. The player hears the sound effect when the second object 52 starts moving at a far location, and hears the sound effect when the second object 52 reaches the position of the first object 51 at a close location. In this way, the movement of the second object 52 can be represented realistically as if it was occurring in the real world. Since the sound is generated at a location close to the player when the item approaches the player object, the player can identify himself/herself as the player object. Since the controller 7 operated by the player to acquire the item generates the sound, the player strongly feels that he/she acquired the item himself/herself.

Figure 13:
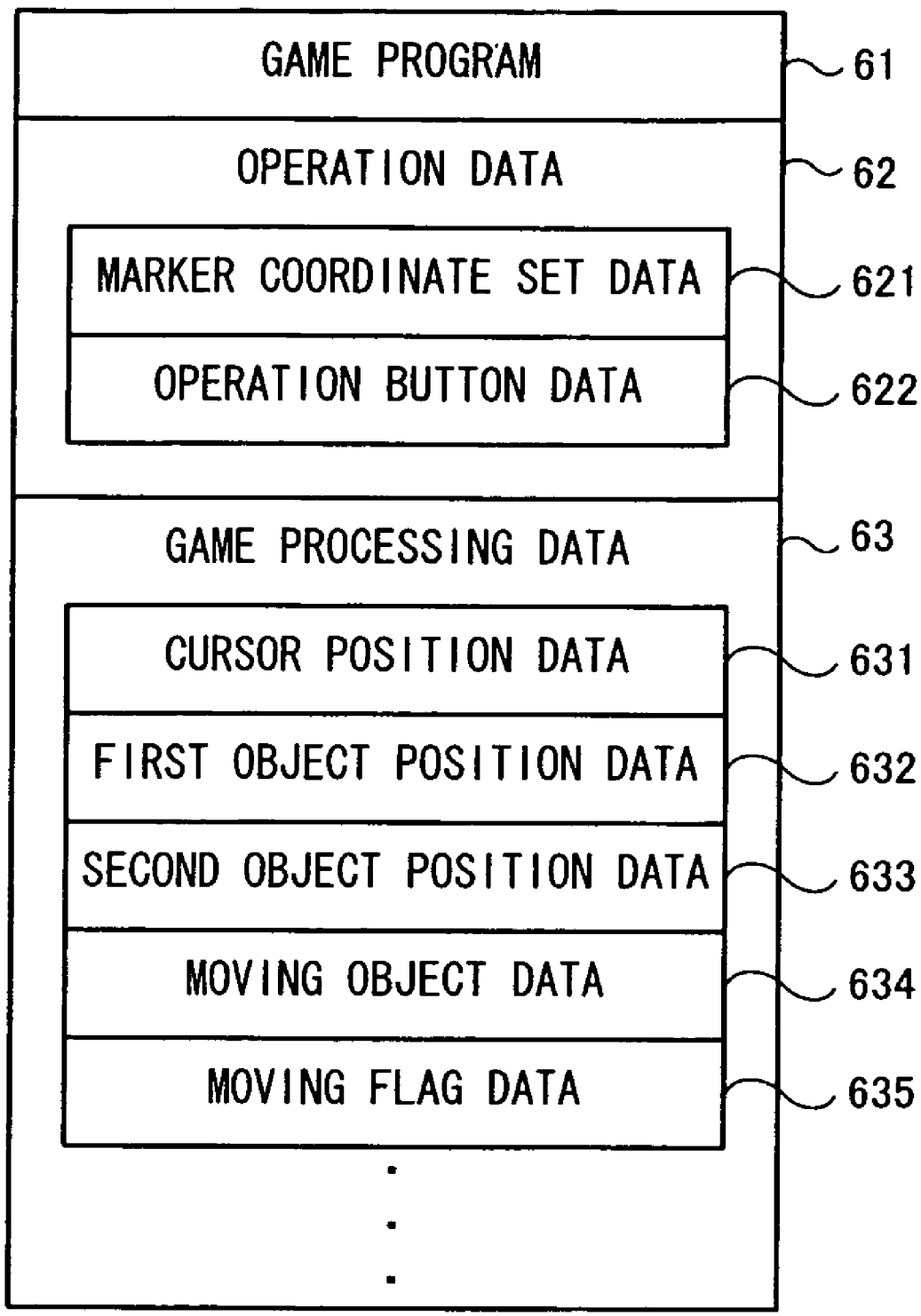
FIG. 13 shows main data stored on a main memory 13 of the game apparatus 3.

Next, game processing executed by the game apparatus 3 in this embodiment will be described. First, with reference to FIG. 13, main data used for the game processing will be described. FIG. 13 shows main data stored on the main memory 13 of the game apparatus 3. As shown in FIG. 13, the main memory 13 has stored thereon a game program 61, operation data 62, game processing data 63 and the like. The main memory 13 has stored thereon image data of the objects appearing in the game, data on sound effects and background music, and other data required for the game processing as well as the above-described data.

The game program 61 is partially or entirely read from the optical disc 4 at an appropriate timing after the game apparatus 3 is turned on, and is stored on the main memory 13. The game program 61 includes programs necessary for executing the game processing described later.

The operation data 62 is transmitted from the controller 7 to the game apparatus 3 and is stored on the main memory 13. The operation data 62 includes marker coordinate set data 621 and operation button data 622. The marker coordinate set data 621 represents positions of the imaging targets (markers 8a and 8b) in the taken image, i.e., the marker coordinate sets described above. The operation button data 622 represents an operation particular performed on each of the operation buttons 32a through 32i (whether or not each of the operation buttons 32a through 32i is pressed). The operation data 62 may include acceleration data representing an output from the acceleration sensor 37, in addition to the marker coordinate set data 621 and the operation button data 622.

The game processing data 63 is used for the game processing described later. The game processing data 63 includes cursor position data 631, first object position data 632, second object position data 633, moving object data 634, and moving flag data 635.

The cursor position data 631 shows a position of the cursor 53 on the screen of the monitor 2. Specifically, the cursor position data 631 represents a coordinate set of a two-dimensional screen coordinate system, which is defined to represent positions on the screen. As described later in more detail, the cursor position data 631 is calculated based on the marker coordinate set data 621.

The first object position data 632 represents a position of the first object 51 in a virtual game space. The second object position data 633 represents a position of a second object 52 in the game space. The first object position data 632 and the second object position data 633 each represent a coordinate set in a three-dimensional world coordinate system, which is defined to represent positions in the game space. FIG. 13 shows only one piece of second object position data 633, but in actuality, the main memory 13 has a number of pieces of second object position data 633 corresponding to the number of the second objects 52 appearing in the game space.

The moving object data 634 represents a second object 52, among the plurality of second objects 52 appearing in the game space, which is currently moving as a result of being designated by the cursor 53. Hereinafter, an object which is currently moving will be referred to as a "moving object". The plurality of second objects 52 are each assigned an inherent identifier. The moving object data 634 represents the identifier of the moving object.

The moving flag data 635 represents a moving flag indicating whether or not the moving object is to be allowed to exist. The moving flag is on when a moving object is to be allowed to exist, and is off when no moving object is to be allowed to exist.

Figure 14:
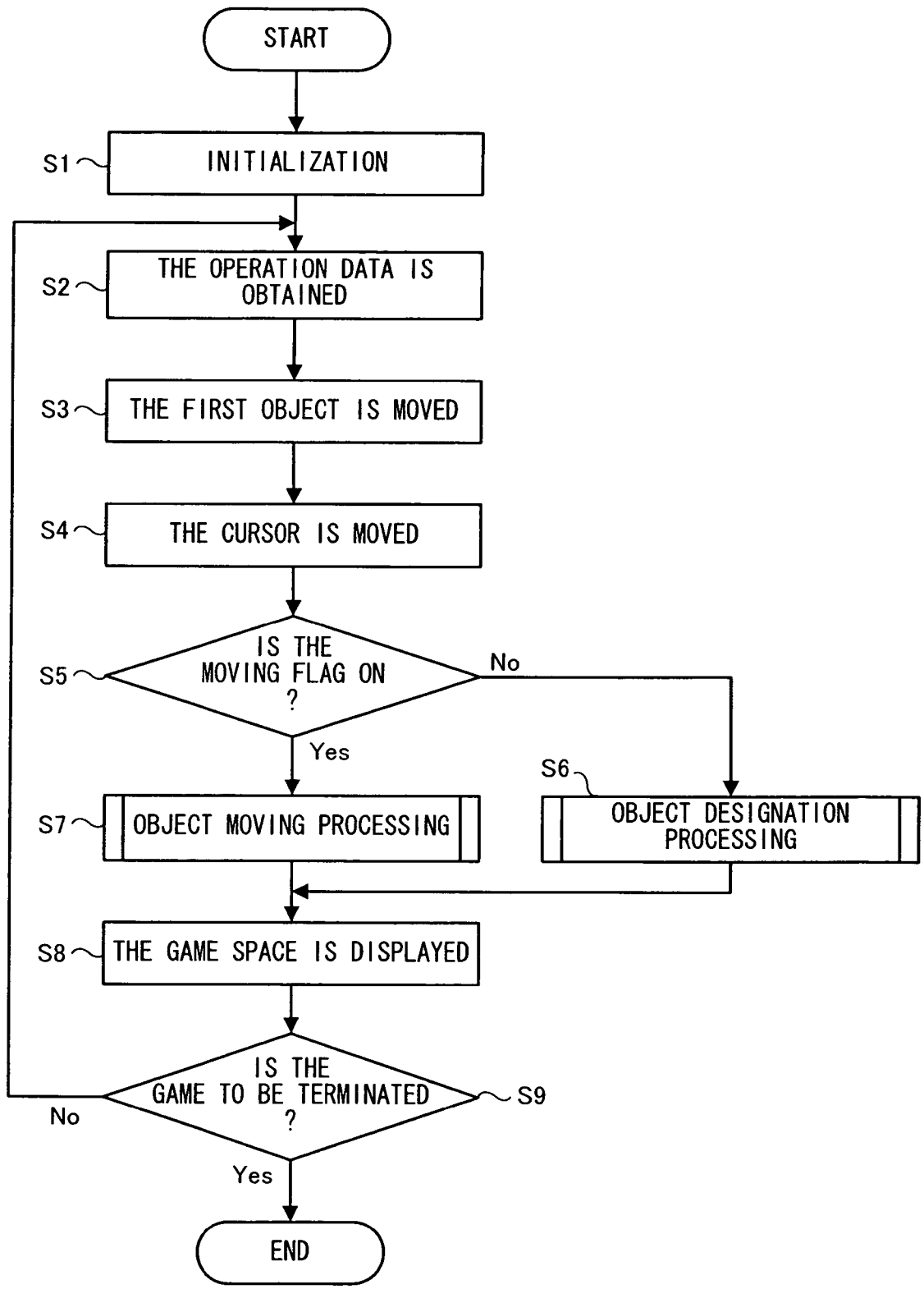
FIG. 14 is a main flowchart illustrating a flow of processing executed by the game apparatus 3.

Next, with reference to FIG. 14 through FIG. 16, the game processing executed by the game apparatus 3 will be described in detail. FIG. 14 is a main flowchart illustrating a flow of processing executed by the game apparatus 3. When the game apparatus 3 is turned on, the CPU 10 of the game apparatus 3 executes a start program stored on the boot ROM (not shown) to initialize each unit such as the main memory 13. The game program stored on the optical disc 4 is read into the main memory 13, and the CPU 10 starts the execution of the game program. The flowchart shown in FIG. 14 illustrates the processing executed after the above-described processing is completed.

First in step S1, the CPU 10 initializes data used in the subsequent processing. Specifically, in step S1, for example, a three-dimensional game space (or a two-dimensional game space) is constructed, and the first and second objects 51 and 52 appearing in the game are located at predetermined initial positions. In more detail, the first object position data 632 and the second object position data 633 stored on the main memory 13 are set to represent a predetermined initial position of the respective object. At the start of the game, there is no moving object. Therefore, the moving object data 634 is not stored on the main memory 13, or data indicating that there is no moving object is stored on the main memory 13 as the moving object data 634. The moving flag data 635 is set to off. Then, a game image representing the constructed game space is generated and displayed on the monitor 2. After step S1, a processing loop of steps S2 through S6 is repeated for each frame. Thus, the game proceeds.

In step S2, the CPU 10 obtains the operation data from the controller 7. In more detail, the controller 7 transmits the operation data to the game apparatus 3 at a predetermined time interval (for example, at an interval of one frame or a shorter period), and the CPU 10 stores the transmitted operation data on the main memory 13. The operation data 62 includes at least the marker coordinate set data 621 and the operation button data 622. The CPU 10 stores the marker coordinate set data 621 and the operation button data 622 included in the operation data 62 on the main memory 13. When the marker coordinate set data 621 and the operation button data 622 are already stored on the main memory 13, the contents of the marker coordinate set data 621 and the operation button data 622 are updated to those of the transmitted data and stored on the main memory 13. In this embodiment, the processing in step S2 is executed for each frame, and thus the game apparatus 3 can sequentially obtain the operation data.

Next in step S3, the CPU 10 moves the first object 51 in the game space. The movement of the first object 51 is controlled in accordance with an input to the cross key 32a of the controller 7. In more detail, the CPU 10 determines whether or not each of up, down, right and left portions of the cross key 32a has been pressed based on the operation button data 622 included in the operation data 62. The CPU 10 moves the first object 51 in accordance with the portion of the cross key 32a which has been pressed. The content of the first object position data 632 stored on the main memory 13 is updated to represent the post-movement position.

Next in step S4, the CPU 10 moves the position of the cursor 53. As described above, the cursor 53 is displayed at the indicated position by the controller 7. Specifically, the position of the cursor 53 (the indicated position by the controller 7) is calculated based on the marker coordinate set represented by the marker coordinate set data 621 stored on the main memory 13. Any method is usable to calculate the indicated position by the controller 7, but the following method is, for example, usable.

Hereinafter, an exemplary method for calculating the indicated position by the controller 7 will be described. The marker coordinate set data 621 obtained from the controller 7 represents two marker coordinate sets corresponding to the markers 8a and 8b. Accordingly, the CPU 10 first calculates the position of an intermediate point between the two marker coordinate sets from the marker coordinate set data 621. The position of the intermediate point is represented by the X-Y coordinate system, which is defined for represent positions on a plane corresponding to the taken image. Next, the CPU 10 executes correction processing of rotating the intermediate point around the center of the taken image as an axis, such that a vector connecting the two coordinate sets is parallel to the Y axis. The correction processing is executed in order to allow the indicated position to be accurately calculated even when the controller 7 is inclined. Next, the CPU 10 converts the coordinate set representing the post-correction position of the intermediate point into a coordinate set of the screen coordinate system (X'-Y' coordinate system), which is defined to represent positions on the screen of the monitor 2. This conversion can be performed using a function of converting the coordinate set of the intermediate point calculated from the taken image into a coordinate set on the screen corresponding to the actual indicated position by the controller 7 when the taken image is taken by the imaging element 40. The indicated position by the controller 7 and the positions of the marker coordinate sets in the taken image move in the opposite directions. Therefore, the conversion is performed such that the top and the bottom are inverted and the right and the left are inverted between the coordinate systems. The position represented by the coordinate set in the X'-Y' coordinate set which is calculated by such conversion is the indicated position by the controller 7. Data representing the calculated coordinate set is stored on the main memory 13 as the cursor position data 631.

Next in step S5, the CPU 10 determines whether or not the moving flag is set to on, i.e., whether or not the moving flag data 635 stored on the main memory 13 represents "on". The processing in step S5 is executed in order to determine whether or not any of the second objects 52 is moving as a result of being designated by the cursor 53. When it is determined in step S5 that the moving flag is on, processing in step S7 is executed. By contrast, when it is determined in step S5 that the moving flag is off, processing in step S6 is executed.

In step S6, object designation processing is executed. The object designation processing is executed in order to designate an object to be moved among the second objects displayed on the screen. Hereinafter, with reference to FIG. 15, the object designation processing will be described in detail.

Figure 15:
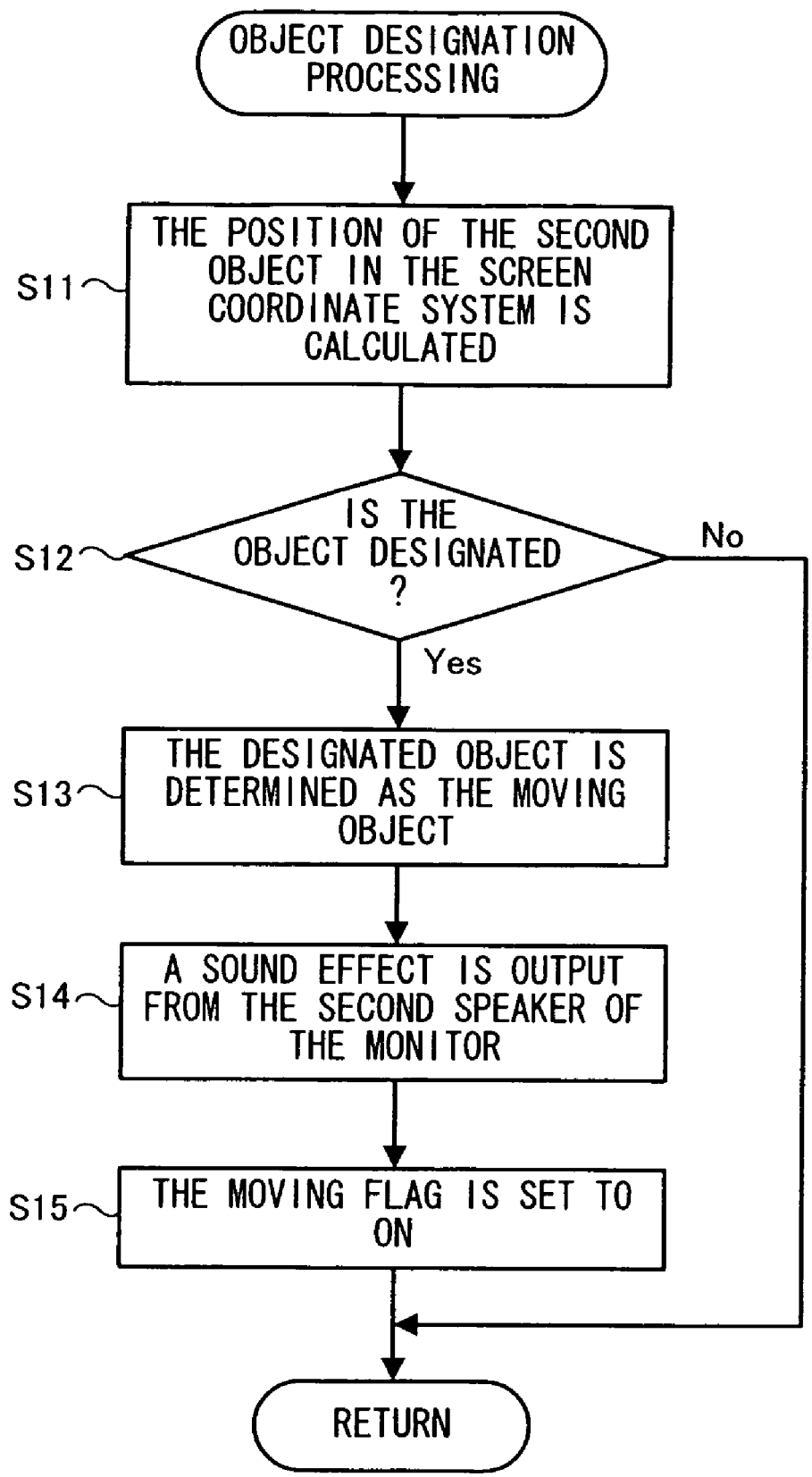
FIG. 15 is a flowchart illustrating object designation processing (step S6) shown in FIG. 14.

FIG. 15 is a flowchart illustrating the object designation processing shown in FIG. 14 (step S6) in detail. The object designation processing is executed as follows. First in step S11, the CPU 10 calculates the positions of the second objects 52 in the screen coordinate system. The second object position data 633 stored on the main memory 13 represents a coordinate set in the world coordinate system, which is defined to represent positions in the three-dimensional game space. In step S11, the coordinate set in the world coordinate system is converted into a coordinate set in the screen coordinate system. Specifically, the position of the second object 52 in the screen coordinate system is obtained as follows. First, a position of the second object 52, which would be obtained when projected on a projection plane corresponding to the screen, is calculated. Then, the position on the projection plane is converted into a position on the corresponding screen. Thus, the position of the second object 52 in the screen coordinate system is obtained. The position in the screen coordinate system is calculated for all the second objects 52 displayed on the screen.

Next in step S12, the CPU 10 determines whether or not any of the second objects 52 is designated by the cursor 53. The determination in step S12 is made based on the cursor position represented by the cursor position data 631 and the position of each second object 52 calculated in step S11. When the cursor position is within a predetermined distance from any of the positions of the second objects 52 on the screen, it is determined that the second object 52 located within the predetermined distance from the cursor position is designated by the cursor 53. When the cursor position is not within the predetermined distance from any of the positions of the second objects 52 on the screen, it is determined that no second object 52 is designated by the cursor 53. The predetermined distance is determined in advance by the game program. When it is determined in step S12 that a second object 52 is designated by the cursor 53, processing in steps S13 through S15 is executed. By contrast, when it is determined in step S12 that no second object 52 is designated by the cursor 53, the processing in steps S13 through S15 is skipped and the CPU 10 terminates the object designation processing.

In this embodiment, when the cursor 53 is within the predetermined distance from a second object 52, the game apparatus 3 determines that the second object 52 is designated by the cursor 53. In another embodiment, when the cursor 53 is within the predetermined distance from a second object 52 and a predetermined button (for example, the B button 32i) of the controller 7 is pressed in that state, it may be determined that the second object 52 is designated by the cursor 53. Specifically, the CPU 10 may determine whether or not the predetermined button is pressed after step S11 but before step S12. In this case, when the determination result is positive, the CPU 10 executes the processing in step S12. When the determination result is negative, the CPU 10 terminates the object designation processing.

In step S13, the CPU 10 determines the second object 52 designated by the cursor 53 as the moving object. As described above, the second object 52 designated by the cursor 53 is the second object determined in step S12 as being located within the predetermined distance from the cursor position. In step S13, data representing the second object 52 designated by the cursor 53 is stored on the main memory 13 as the moving object data 634.

Next in step S14, the CPU 10 generates a sound effect from the second speaker 22 of the monitor 2. Specifically, sound data corresponding to the sound effect to be generated is output from the second speaker 22 using the DSP 14 and the ARAM 15. Such sound data is stored on the main memory 13. In this way, the sound effect indicating that the second object 52 started moving is generated from the second speaker 22.

Next in step S15, the CPU 10 sets the moving flag to on. In more detail, the content of the moving flag data 635 stored on the main memory 13 is rewritten with the data representing "on". By such processing, the next time the processing loop of steps S2 through S9 is executed, the determination result in step S5 is positive. Therefore, in the next execution of the processing loop of steps S2 through S9, object moving processing (step S7) is executed. After step S15, the CPU 10 terminates the object designation processing.

Returning to FIG. 14, in step S7, the object moving processing is executed. The object moving processing is executed in order to move the second object 52 designated in the object designation processing (moving object). Hereinafter, with reference to FIG. 16, the object moving processing will be described in detail.

Figure 16:
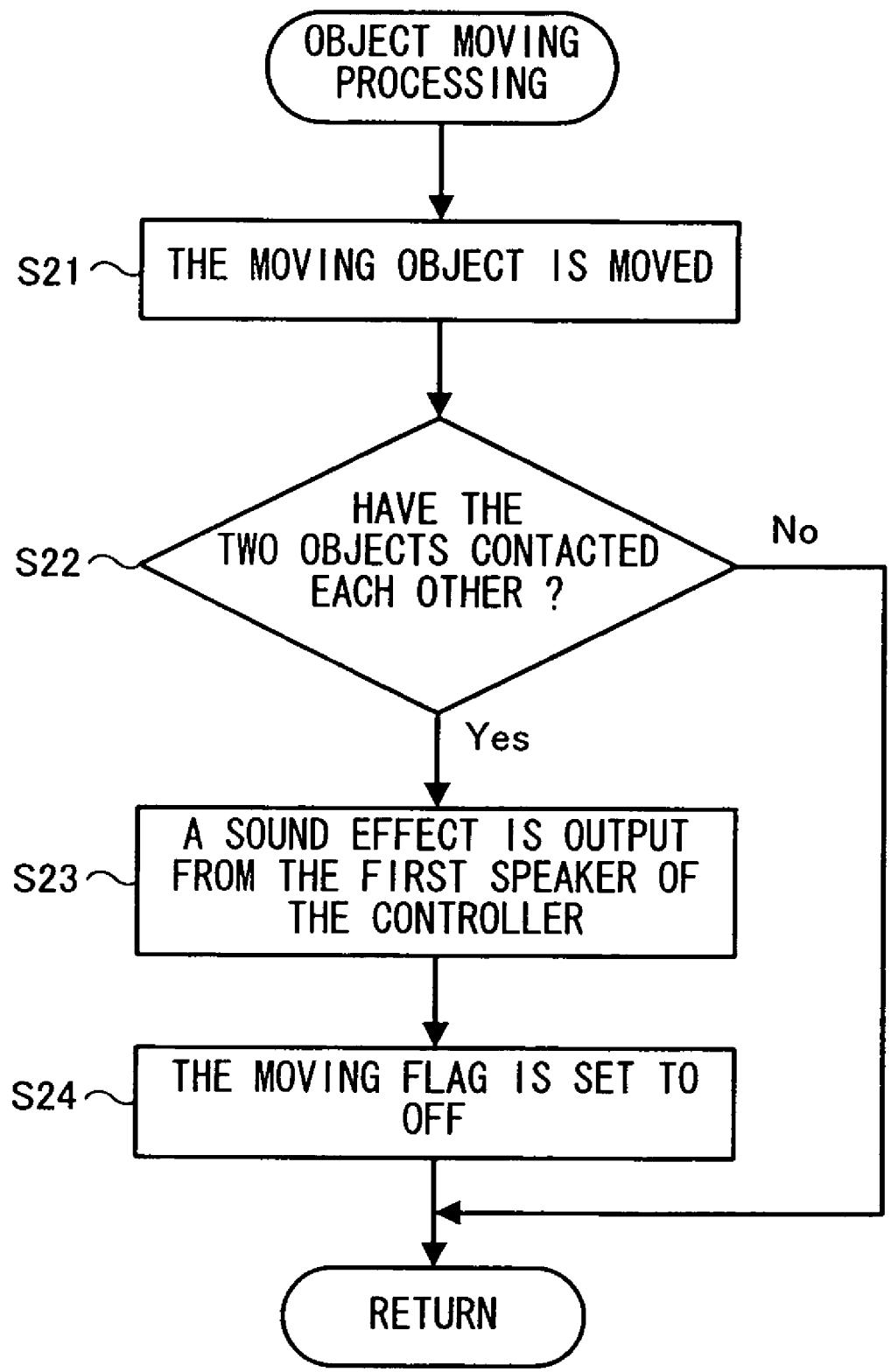
FIG. 16 is a flowchart illustrating object moving processing (step S7) shown in FIG. 14.

FIG. 16 is a flowchart illustrating the object moving processing shown in FIG. 14 (step S7) in detail. The object moving processing is executed as follows. First in step S21, the CPU 10 moves the moving object. Specifically, the moving object in the game space is moved to a new position in accordance with a predetermined moving rule. At this point, the second object position data 633 representing the position of the moving object is updated to data representing the post-movement position.

In this embodiment, according to the predetermined moving rule, the moving object is moved toward the first object 51 by a predetermined distance. Thus, the moving object is moved toward the first object 51 by the predetermined distance in each frame, namely, at a constant speed. In another embodiment, any moving rule is applicable. The moving rule may be, for example, such that the moving object is moved so as to follow the first object 51, or in a constant direction. The moving rule may be such that the moving object is moved toward the first object 51, or in a predetermined direction. The moving rule may be such that the moving object is moved in a direction determined in accordance with the situation in the game except for toward the first object 51, or in a randomly determined direction.

In step S22, the CPU 10 determines whether or not the moving object and the first object 51 have contacted each other. The determination in step S22 is made based on the second object position data 633 representing the position of the moving object and the first object position data 632. Specifically, when the position of the moving object represented by the second object position data 633 and the position of the first object 51 represented by the first object position data 632 are within a predetermined distance, it is determined that the moving object and the first object 51 have contacted each other. By contrast, when the position of the moving object and the position of the first object 51 are not within the predetermined distance, it is determined that the moving object and the first object 51 have not contacted each other. When the determination result in step S22 is positive, processing in steps S23 and S24 is executed. By contrast, when the determination result in step S22 is negative, the processing in steps S23 and S24 is skipped and the CPU 10 terminates the object moving processing.

In step S23, the CPU 10 generates a sound effect from the first speaker 49 of the controller 7. Specifically, sound data corresponding to the sound effect to be generated is transmitted to the controller 7. Such sound data is stored on the main memory 13. Upon receiving the sound data transmitted from the game apparatus 3, the controller 7 outputs the sound data to the first speaker 49. In this way, the sound effect indicating that the moving object has been acquired is generated from the first speaker 49.

The sound effect generated in step S23 may be of the same type as, or of a different type from, the sound effect generated in step S14. In this embodiment, the sound effects are generated from different speakers in steps S23 and S14. Therefore, even if the sound effects are of the same type, the player can distinguish these sound effects.

In step S24, the CPU 10 sets the moving flag to off. In more detail, the content of the moving flag data 635 stored on the main memory 13 is rewritten with data representing "off". By such processing, the next time the processing loop of steps S2 through S9 is executed, the determination result in step S5 is negative. Therefore, in the next execution of the processing loop of steps S2 through S9, the object designation processing (step S6) is executed. After step S24, the CPU 10 terminates the object moving processing.

When it is determined in step S22 that the first object 51 and the moving object have contacted each other, the CPU 10 determines that the moving object have been acquired by the first object 51, and erases the second object position data 633 representing the position of the moving object from the main memory 13. Thus, the moving object is erased from the game space. At this point, as shown in FIG. 12, the CPU 10 executes processing of, for example, increasing the number of the acquired items and the like as necessary.

Returning to FIG. 14, after step S6 or S7, processing in step S8 is executed. In step S8, the CPU 10 causes the monitor 2 to display a game image representing the game space. Specifically, a game image, in which the first object 51 and the second objects 52 are located in the game space in accordance with the positions represented by the first object position data 632 and the second object position data 633, is displayed on the monitor 2. The cursor 53 is displayed at the position represented by the cursor position data 631.

Next in step S9, the CPU 10 determines whether or not the game is to be terminated. The determination in step S9 is made based on, for example, whether or not the player made an instruction to terminate the game, whether or not the player cleared the game, or in the case where a time limit is set for the game, whether or not the time has passed. When the determination result in step S9 is negative, the processing is returned to step S2 and the processing loop of steps S2 through S9 is repeated until it is determined that the game is to be terminated. By contrast, when the determination result in step S9 is positive, the CPU 10 terminates the processing shown in FIG. 14. The game apparatus 3 executes the game processing in this manner.

In the above game processing, the second object 52 is at a pause unless being designated by the cursor 53. In another embodiment, the second object 52 may move even when not being designated by the cursor 53. In this specification, the expression "the object starts moving" means that "the object starts a movement which conforms to a certain rule", and does not mean that the object is necessarily at a pause before starting such a movement which conforms to the certain rule. The "certain rule" is that the second object 52 approaches the first object 51 when designated by the cursor 53 in the above embodiment. In the case where the second object 52 moves before being designated by the cursor 53, the game apparatus 3 may change the moving rule after the second object 52 is designated by the cursor 53 as follows. When the second object 52 moving in accordance with a predetermined first moving rule is designated by the cursor 53, the game apparatus 3 may cause the second object 52 to start moving in accordance with a second moving rule, which is different from the first moving rule. When the second object 52 starts moving in accordance with the second moving rule, a sound effect is generated from the first speaker 49. Owing to the sound effect, the player can recognize that the second object 52 started moving in accordance with the second moving rule.

As described above, in this embodiment, a sound effect when the second object starts moving and a sound effect when the second object stops moving are selectively generated from the two speakers 22 and 49. Owing to this, the movement of the second object 52 can be recognized by the display on the screen and also by the sound effects. In this embodiment, a sound effect representing an event which occurred at a location (relatively) close to the first object 51 in the game space (the event that the first object 51 acquired the second object 52) is generated from the first speaker 49 of the controller 7 held by the player's hand. By contrast, a sound effect representing an event which occurred at a location (relatively) far from the first object 51 in the game space (the event that the second object 52 started moving) is generated from the second speaker 22 of the monitor 2 located far from the player. The player feels as if he/she was the first object 51 in the game space, which makes the game more realistic. Since the sound is generated from the controller 7 operated by the player to acquire the item, the player strongly feels that he/she acquired the item himself/herself. In the above embodiment, a sound is generated from the second speaker 22 when the second object 52 starts moving; whereas a sound is generated from the first speaker 49 when the second object 52 stops moving. In another embodiment, for example, in the case where a predetermined object is flown (moved) from the position of the player object in a direction indicated by the player, sounds may be generated as follows. When the second object (i.e., the object to be flown) starts moving, a sound is generated from the first speaker; whereas when the second object stops moving, a sound is generated from the second speaker. With such a structure, the game is made realistic. The player can strongly feel as if he/she was actually flying the object.

(Modification Regarding the Locations of the Speakers)

In the above embodiment, the second speaker 22 is built in the monitor 2 connected to the game apparatus 3. In another embodiment, the second speaker 22 may be located at any position far from the first speaker, and may be provided at any position outside the controller 7. For example, the second speaker 22 may be separate from the monitor 22. In the case where, for example, the game apparatus 3 is an arcade game apparatus, the second speaker 22 may be built in the game apparatus 3. In the case where a plurality of players each use one controller 7 to play the game together, the speaker of one controller may be used as the first speaker whereas the speaker of another controller may be used as the second speaker (see the other games described below).

(Modifications on the Type of the Game)

In the above embodiment, the game in which the first object 51 is operated to acquire the second object 52 is described as an exemplary game playable with the game apparatus 3. Other games playable with the game apparatus 3 include a baseball game and a tennis game.

Figure 17:
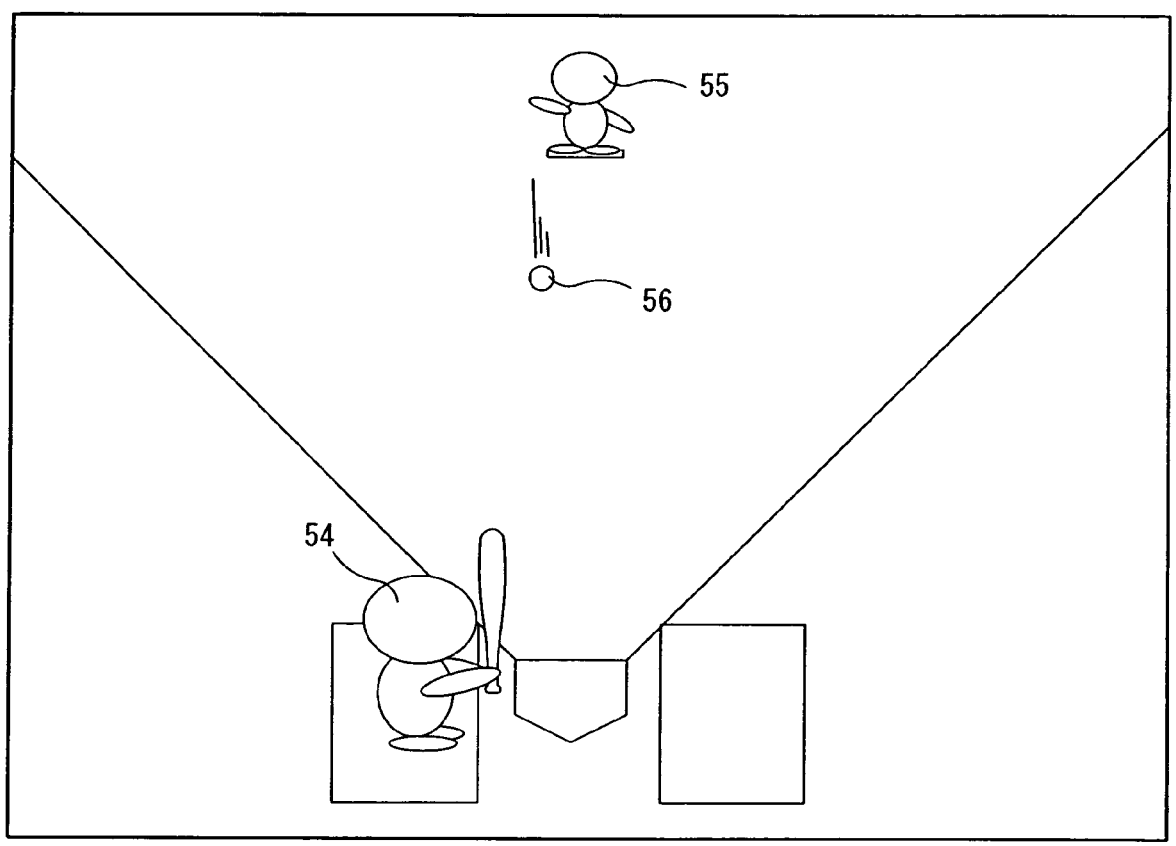
FIG. 17 shows a game image of another game playable with the game apparatus 3.

FIG. 17 shows a game image of another game playable with the game apparatus 3. The game image shown in FIG. 17 shows a baseball game in which a pitcher and a batter appear. As shown in FIG. 17, in this game, a batter object representing a batter (hereinafter, referred to simply as a "batter") 54, a pitcher object representing a pitcher (hereinafter, referred to simply as a "pitcher") 55, and a ball object representing a ball (hereinafter, referred to simply as a "ball") 56 are displayed. This baseball game is played by two players of a first player and a second player using two controllers 7 described above. The first player uses the first controller to operate the batter 54, and the second player uses the second controller to operate the pitcher 55.

The game processing is executed as follows. The game apparatus 3 first determines whether or not a predetermine time when the pitcher 55 is to pitch has come. For example, the game apparatus 3 determines whether or not a predetermined button provided on the second controller has been pressed. When it is determined that the predetermined time has come, the game apparatus 3 causes the pitcher 55 to make a motion of throwing the ball 56. Also, a sound effect is generated from the speaker of the second controller. By the motion of the pitcher 55 of throwing the ball 56, the ball 56 moves toward the batter 54.

After the pitcher 55 throws the ball 56, the first player performs an operation of causing the batter 54 to make a hitting motion at an appropriate timing. This operation may be an operation of pressing a predetermined button on the first controller, or an operation of swinging the first controller itself. It is determined whether or not the operation of swinging the first controller has been performed by, for example, detecting an acceleration using an acceleration sensor built in the first controller. The game apparatus 3 determines whether or not the operation of causing the batter 54 to make a hitting motion has been performed. When it is determined that such an operation has been performed, the game apparatus 3 causes the batter 54 to make a motion of swinging a bat. Then, the game apparatus 3 determines whether or not the bat hit the ball 56. When it is determined that the bat hit the ball 56, the game apparatus 3 moves the ball 56 based on the angle, strength or the like at which the bat hit the ball 56. Also, the game apparatus 3 generates a sound effect from the speaker of the first controller. The motion of the pitcher 55 of throwing the ball 56 may also be provided by an operation of swinging the controller itself.

In the above-described baseball game, when a condition for starting the movement of the ball 56 is fulfilled, a sound effect is generated from the speaker of the second controller.

When the ball 56 hits the ball 56 as a result of the movement of the ball 56, a sound effect is generated from the speaker of the first controller. Namely, the game apparatus 3 selectively outputs a sound effect when the ball 56 starts moving and a sound effect when the ball 56 stops moving from two different speakers. Owing to this, the movement of the ball 56 can be recognized by the display on the screen and also by the sound effects.

In the above-described baseball game, the first player hears the sound effect when the pitcher 55 throws the ball 56 from the speaker of the second controller which is located relatively far from him/her, and hears the sound effect when the batter 54 hits the ball 56 from the speaker of the first controller which is located relatively close to him/her. The second player hears the sound effect when the pitcher 55 throws the ball 56 from the speaker of the second controller which is located relatively close to him/her, and hears the sound effect when the batter 54 hits the ball 56 from the speaker of the first controller which is located relatively far from him/her. In this manner, each player hears a sound effect representing an event which occurred close to him/her at a location close to him/her. Therefore, the player feels as if he/she was the object in the game space, which makes the game more realistic.

Figure 18:
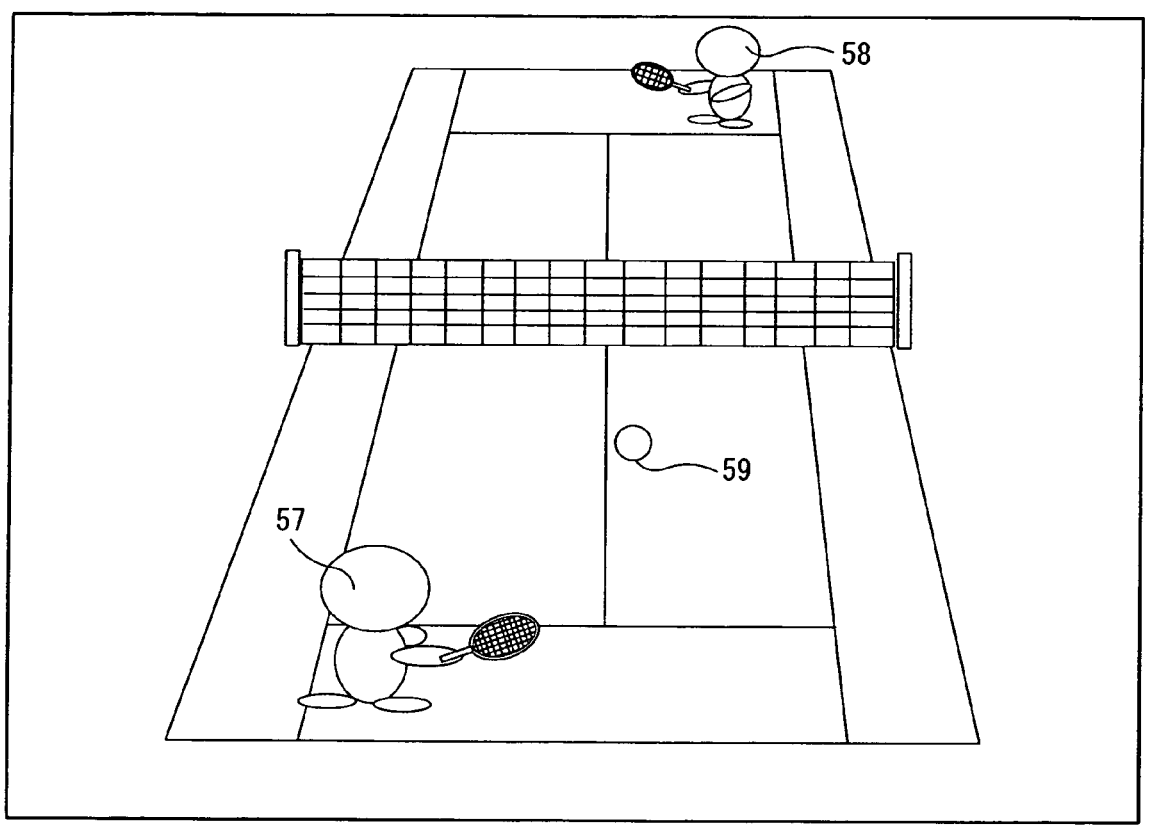
FIG. 18 shows a game image of still another game playable with the game apparatus 3.

FIG. 18 shows a game image of still another game playable with the game apparatus 3. The game image shown in FIG. 18 shows a tennis game. As shown in FIG. 18, in this tennis game, two objects 57 and 58 representing two tennis players and a ball object representing a ball (hereinafter, referred to simply as a "ball") 59 are displayed. This tennis game is played by two players of a first player and a second player using two controllers 7 described above. The first player uses the first controller to operate the first object 57, and the second player uses the second controller to operate the second object 58.

The game processing is executed as follows. The game apparatus 3 determines whether or not an operation of causing the object 57 or 58 to make a hitting motion has been performed. When it is determined that such an operation has been performed, the game apparatus 3 causes the object 57 or 58 to make a motion of swinging a racket. Then, the game apparatus 3 determines whether or not the racket hit the ball 59. When it is determined that the racket hit the ball 59, the game apparatus 3 moves the ball 59 based on the angle, strength or the like at which the racket hit the ball 59. Also, the game apparatus 3 generates a sound effect. When the racket of the first object 57 hit the ball 59, the game apparatus 3 generates a sound effect from the speaker of the first controller; whereas when the racket of the second object 58 hit the ball 59, the game apparatus 3 generates a sound effect from the speaker of the second controller. The tennis game proceeds by the repetition of (a) the processing of determining whether or not the racket hit the ball 59, and (b) the processing of moving the ball 59.

In the above-described tennis game, as in the baseball game, when a condition for starting the movement of the ball 59 (the racket ball hit the ball 59) is fulfilled, a sound effect is generated from the speaker of one of the controllers. When the ball 59 hits the racket as a result of the movement of the ball 59, a sound effect is generated from the speaker of the other controller. Namely, the game apparatus 3 selectively outputs a sound effect when the ball 59 starts moving and a sound effect when the ball 59 stops moving from two different speakers. Owing to this, the movement of the ball 59 can be recognized by the display on the screen and also by the sound effects, as in the baseball game.

In the above-described tennis game, as in the baseball game, each player hears the sound effect when the racket of his/her object hits the ball 59 from the speaker of his/her controller which is located relatively close to him/her, and hears the sound effect when the racket of the other player's object hits the ball 59 from the speaker of the other player's controller which is located relatively far from him/her. In this manner, each player hears a sound effect representing an event which occurred close to him/her at a location close to him/her. Therefore, the player feels as if he/she was the object in the game space, which makes the game more realistic.

In the case where one player plays the baseball game or the tennis game, the sound effects may be generated from the speaker of the controller used by the player and the speaker built in the monitor 2. For example, in the baseball game, when the player operates the batter 54, the game apparatus 3 may generate a sound effect when the pitcher 55 throws the ball 56 from the speaker built in the monitor 2.

(Modification on the Condition for Outputting a Sound Effect)

In the above embodiment, the condition for outputting a sound effect from the first speaker 49 of the controller 7 is that the first object 51 operated by the player and the moving object are in a predetermined positional relationship (i.e., contacted each other). In another embodiment, the condition only needs to be regarding the position of the moving object. For example, the condition may be that the moving object and another object are in a predetermined positional relationship, or that the moving object has reached a predetermined position. For example, in the case where a virtual camera is installed for generating a game image of the virtual three-dimensional game space, the game apparatus 3 may generate a sound effect from the first speaker 49 when the moving object has reached a position within a predetermined distance from the virtual camera.

As described above, the present invention is applicable to a game apparatus or a game program for the purpose of, for example, making various sound effects generated when an object moves in a game space more realistic.

While the invention has been described in detail, the foregoing description is in all aspects illustrative and not restrictive. It is understood that numerous other modifications and variations can be devised without departing from the scope of the invention.

What is claimed is:

1. A game apparatus for allowing a first speaker provided in an input device and a second speaker provided outside the input device to generate a sound, the game apparatus comprising a processing unit executing an executable program stored on a non-transitory, tangible storage medium readable by the processing unit, wherein the executable program causes the processing unit in the game apparatus to perform:

a determination step to determine whether or not a predetermined first condition is fulfilled;

a first sound control step to cause the second speaker to generate a sound when the first condition is fulfilled;

a moving control step to move an object in a virtual game space in response to the fulfillment of the first condition, wherein the movement of the object immediately after the fulfillment of the first condition differs from a movement of the object immediately prior to the fulfillment of the first condition;

a second sound control step to cause the first speaker to generate a sound when a predetermined second condition regarding a position of the object is fulfilled as a result of the object being moved by the moving control step; and display control step for causing a display device to display the game space, wherein the display device shows the object moving in the moving control step after the first condition is fulfilled and before the second sound control step.

2. A game apparatus according to claim 1, wherein the executable program further causes the processing unit to perform an indicated position calculation step to calculate an indicated position on a screen of the display device based on an operation input to the input device;
wherein the determination step uses, as the first condition, that the object is designated by the operation input to the input device, and determines whether or not the first condition is fulfilled by comparing the indicated position and the position of the object on the screen.

3. A game apparatus according to claim 2, wherein:
at least a moving object movable during the moving control step and a player object operable by a player appear in the game space; and
the second sound control step uses, as the second condition, that the moving object approaches the player object to be within a predetermined distance from the player object.

4. A game apparatus according to claim 2, wherein:
the input device includes an imaging device; and
the indicated position calculation step calculates the indicated position based on a position of a predetermined imaging target in an image taken by the imaging device.

5. A game apparatus according to claim 1, wherein when the first condition is fulfilled, the moving control step causes an object which has been at a pause or moving in accordance with a predetermined first rule to start moving in accordance with a second rule, which is different from the first rule.

6. A game apparatus according to claim 1, wherein:
at least a moving object movable during the moving control step and a player object operable by a player appear in the game space; and
the second sound control step uses, as the second condition, that the moving object approaches the player object to be within a predetermined distance from the player object.

7. A non-transitory, computer-readable storage medium having stored thereon a game program executable by a computer of a game apparatus for causing a first speaker provided in an input device and a second speaker provided outside the input device to generate a sound; the game program causing the computer to execute:
a determination step to determine whether or not a predetermined first condition is fulfilled;
a first sound control step to cause the second speaker to generate a sound when the first condition is fulfilled;
a moving control step to change a movement of an object in a virtual game space in response to the fulfillment of the first condition;
a second sound control step to cause the first speaker to generate a sound when a predetermined second condition regarding a position of the object is fulfilled as a result of the object being moved in the moving control step; and
a display control step to cause a display device to display the game space, wherein the display device shows the object moving in the moving control step after the first condition is fulfilled and before the second sound control step.

8. A computer-readable storage medium according to claim 7, wherein:
the game program causes the computer to further execute an indicated position calculation step of calculating an indicated position on a screen of the display device based on an operation input to the input device; and
in the determination step, the computer uses, as the first condition, that the object is designated by the operation input to the input device, and determines whether or not the first condition is fulfilled by comparing the indicated position and the position of the object on the screen.

9. A non-transitory computer-readable storage medium according to claim 8, wherein:
at least a moving object movable in the moving control step and a player object operable by a player appear in the game space; and
in the second sound control step, the computer uses, as the second condition, that the moving object approaches the player object to be within a predetermined distance from the player object.

10. A non-transitory computer-readable storage medium according to claim 8, wherein:
the input device includes imaging device; and
in the indicated position calculation step, the computer calculates the indicated position based on a position of a predetermined imaging target in an image taken by the imaging device.

11. A non-transitory computer-readable storage medium according to claim 7, wherein when the first condition is fulfilled, in the moving control step, the computer causes an object which has been at a pause or moving in accordance with a predetermined first rule to start moving in accordance with a second rule, which is different from the first rule.

12. A non-transitory computer-readable storage medium according to claim 7, wherein:
at least a moving object movable in the moving control step and a player object operable by a player appear in the game space; and
in the second sound control step, the computer uses, as the second condition, that the moving object approaches the player object to be within a predetermined distance from the player object.

13. A non-transitory computer-readable storage medium having stored thereon a game program executable by a computer of a game apparatus for causing a first speaker provided in an input device and a second speaker provided outside the input device to generate a sound; the game program causing the computer to execute:
a determination step to determine whether or not a predetermined first condition is fulfilled;
a first sound control step to cause one of the first speaker and the second speaker to generate a sound when the first condition is fulfilled;
a moving control step to change a movement of an object in a virtual game space as a consequence of the first condition being fulfilled;
a second sound control step to cause the other of the first speaker and the second speaker to generate a sound when a predetermined second condition regarding a position of the object is fulfilled as a result of the object being moved in the moving control step; and
a display control step to cause a display device to display the game space, wherein the display device shows the object moving in the moving control step after the first condition is fulfilled and before the second sound control step.

14. A non-transitory computer-readable storage medium having stored thereon a game program executable by a computer of a game apparatus for causing a first speaker provided in a first input device and a second speaker provided in a second input device to generate a sound; the game program causing the computer to execute:
- a determination step to determine whether or not a predetermined first condition is fulfilled;
- a first sound control step to cause the second speaker to generate a sound when the first condition is fulfilled;
- a moving control step to change a movement of an object in a virtual game space as a consequence of the fulfillment of the first condition;
- a second sound control step of causing the first speaker to generate a sound when a predetermined second condition regarding a position of the object is fulfilled as a result of the object being moved in the moving control step; and
- a display control step to cause a display device to display the game space, wherein the display device shows the object moving in the moving control step after the first condition is fulfilled and before the second sound control step.

* * * * *